(12) United States Patent
Kubo et al.

(10) Patent No.: US 12,151,262 B2
(45) Date of Patent: Nov. 26, 2024

(54) VIBRATION GENERATING DEVICE

(71) Applicant: ALPS ALPINE CO., LTD., Tokyo (JP)

(72) Inventors: Kenji Kubo, Miyagi (JP); Takashi Ogihara, Seoul (KR); Hideki Ito, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 153 days.

(21) Appl. No.: 17/933,524

(22) Filed: Sep. 20, 2022

(65) Prior Publication Data
US 2023/0100549 A1    Mar. 30, 2023

(30) Foreign Application Priority Data

Sep. 27, 2021 (JP) .................................. 2021-156878

(51) Int. Cl.
*B06B 1/04* (2006.01)
(52) U.S. Cl.
CPC .................................. *B06B 1/045* (2013.01)
(58) Field of Classification Search
CPC ...................................................... B06B 1/045
USPC ...................................... 335/229; 310/15, 81
See application file for complete search history.

(56) References Cited

U.S. PATENT DOCUMENTS

| | | | | |
|---|---|---|---|---|
| 8,878,401 B2* | 11/2014 | Lee | ......................... | H02K 33/16 310/15 |
| 10,328,461 B2* | 6/2019 | Xu | ......................... | B06B 1/045 |
| 2003/0227225 A1 | 12/2003 | Kaneda et al. | | |
| 2006/0133218 A1 | 6/2006 | Matthey | | |
| 2017/0110950 A1 | 4/2017 | Akanuma et al. | | |
| 2018/0026511 A1* | 1/2018 | Akanuma | ............... | H02K 33/18 310/20 |
| 2018/0297069 A1 | 10/2018 | Hua et al. | | |

FOREIGN PATENT DOCUMENTS

| | | |
|---|---|---|
| JP | 2007-283201 | 11/2007 |
| JP | 2010-207731 | 9/2010 |

OTHER PUBLICATIONS

Extended European Search Report for 22198093.1 mailed on Jan. 30, 2023.
Japanese Office Action for 2021-156878 dated Sep. 10, 2024.

* cited by examiner

*Primary Examiner* — Alexander Talpalatski
(74) *Attorney, Agent, or Firm* — IPUSA, PLLC

(57) ABSTRACT

A vibration generating device includes a housing; a vibration body in the housing; an elastic support member fixed to the housing and supporting the vibration body; and a driver that applies a vibration force to the vibration body. The elastic support member includes a vibration plate configured to support the vibration body; a front fixed plate disposed in front of the vibration plate and fixed to the housing; a rear fixed plate disposed behind the vibration plate and fixed to the housing; a first elastic plate connecting one of a left or right end of the vibration plate to the front fixed plate; and a second elastic plate connecting the other one of the left or right end to the rear fixed plate. The first elastic plate is isolated from the rear fixed plate, and the second elastic plate is isolated from the front fixed plate.

5 Claims, 17 Drawing Sheets

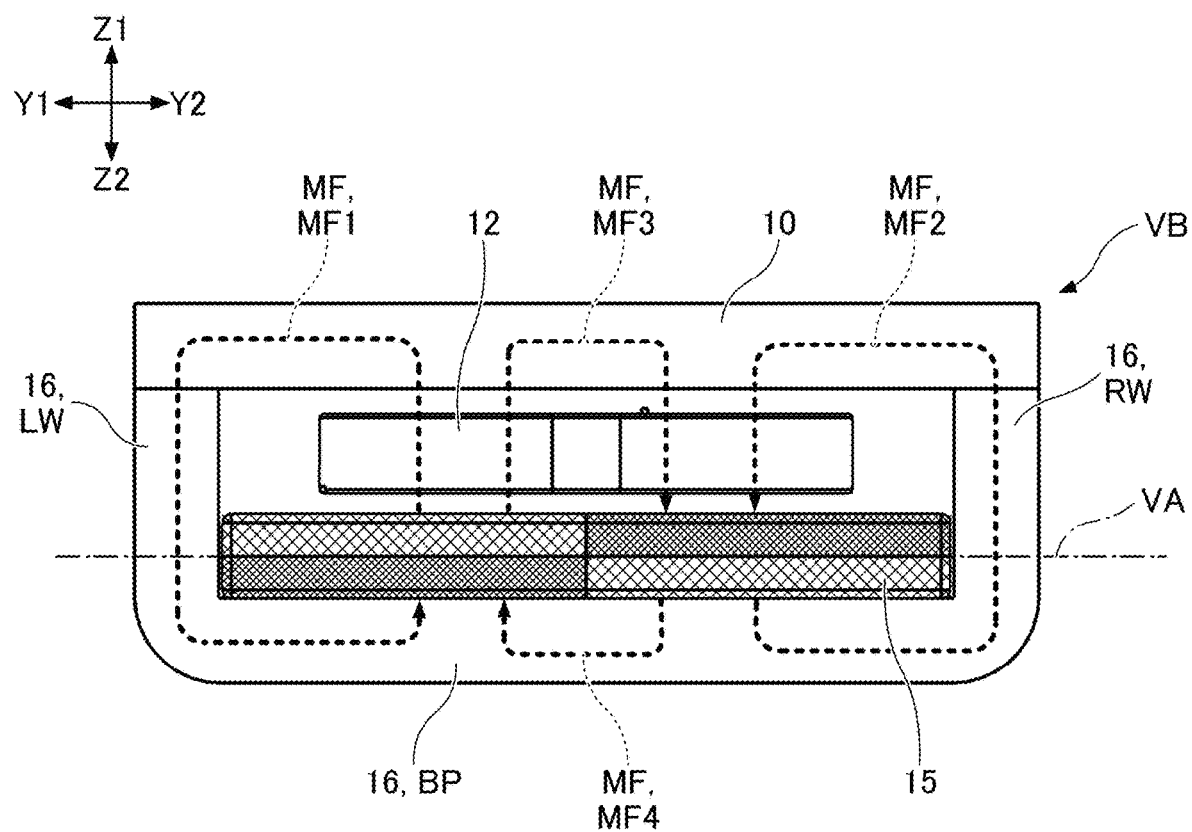

VIBRATION GENERATING DEVICE

CROSS-REFERENCE TO RELATED APPLICATION

The present application is based on and claims priority under 35 U.S.C. § 119 to Japanese Patent Application No. 2021-156878, filed on Sep. 27, 2021, the contents of which are incorporated herein by reference in their entirety.

BACKGROUND OF THE INVENTION

1. Field of the Invention

The present invention relates to a vibration generating device.

2. Description of the Related Art

Conventionally, there is known a vibration generating device that vibrates a permanent magnet as a movable portion by using a magnetic field generated by a coil and a magnetic field generated by the permanent magnet (see Patent Document 1 and Patent Document 2).

[Patent Document 1] Japanese Laid-open Patent Publication No. 2007-283201
[Patent Document 2] US Patent Application Publication No. 2006-133218

SUMMARY OF THE INVENTION

According to one aspect of the present invention, there is provided a vibration generating device including a housing; a vibration body accommodated in the housing; an elastic support member fixed to the housing and configured to support the vibration body so as to be able to vibrate; and a driver configured to apply a vibration force to the vibration body, wherein the elastic support member includes a vibration plate portion configured to support the vibration body; a front fixed plate portion disposed in front of the vibration plate portion and fixed to the housing; a rear fixed plate portion disposed behind the vibration plate portion and fixed to the housing; a first elastic plate portion shaped as a flat plate and configured to connect one end of a left end and a right end of the vibration plate portion to the front fixed plate portion; and a second elastic plate portion shaped as a flat plate and configured to connect the other end of the left end and the right end of the vibration plate portion to the rear fixed plate portion, wherein the first elastic plate portion is isolated from the rear fixed plate portion, and the second elastic plate portion is isolated from the front fixed plate portion.

BRIEF DESCRIPTION OF THE DRAWINGS

FIG. 9 is a front view of a vibration body and a coil.

DETAILED DESCRIPTION OF THE PREFERRED EMBODIMENTS

In the vibration generating device described in Patent Document 1, the permanent magnet is fixed to a base member acting as a fixed body via a plate spring. Specifically, the plate spring includes a pair of substantially M-shaped elastic plate portions facing each other, a front fixed plate portion connecting one of the ends of each of the two elastic plate portions to each other, a rear fixed plate portion connecting the other one of the ends of each of the two elastic plate portions to each other, and a vibration plate portion connecting the lower ends of central portions of each of the two elastic plate portions to each other. The vibration plate portion supports the permanent magnet and is disposed so as not to come into contact with the base member. The front fixed plate portion is fixed to the base member at two positions by caulking. Similarly, the rear fixed plate portion is fixed to the base member at two positions by caulking. In this configuration, the plate spring is firmly fixed to the base member via the front fixed plate portion and the rear fixed plate portion, and, therefore, there is a concern that it is not possible to sufficiently ensure a vibration width of the permanent magnet attached to the vibration plate portion in the horizontal direction.

In the vibration generating device described in Patent Document 2, the permanent magnet is fixed to a base member acting as a fixed body via a plate spring. Specifically, the plate spring includes a pair of substantially inverted U-shaped elastic plate portions facing each other, a front fixed plate portion connecting one of the ends of each of the two elastic plate portions to each other, and a vibration plate portion connecting the other one of the ends of the two elastic plate portions to each other. The vibration plate portion supports the permanent magnet and is disposed so as not to come into contact with the base member. The front fixed plate portion is fixed to the base member at two positions by caulking. In this configuration, the plate spring is fixed to the base member only via the front fixed plate portion, and, therefore, there is a possibility that the permanent magnet attached to the vibration plate portion vibrates largely in the vertical direction.

Therefore, an object of the present invention is to provide a vibration generating device capable of reducing the vibration in the vertical direction while sufficiently ensuring a vibration width in the horizontal direction.

Figure 1A:
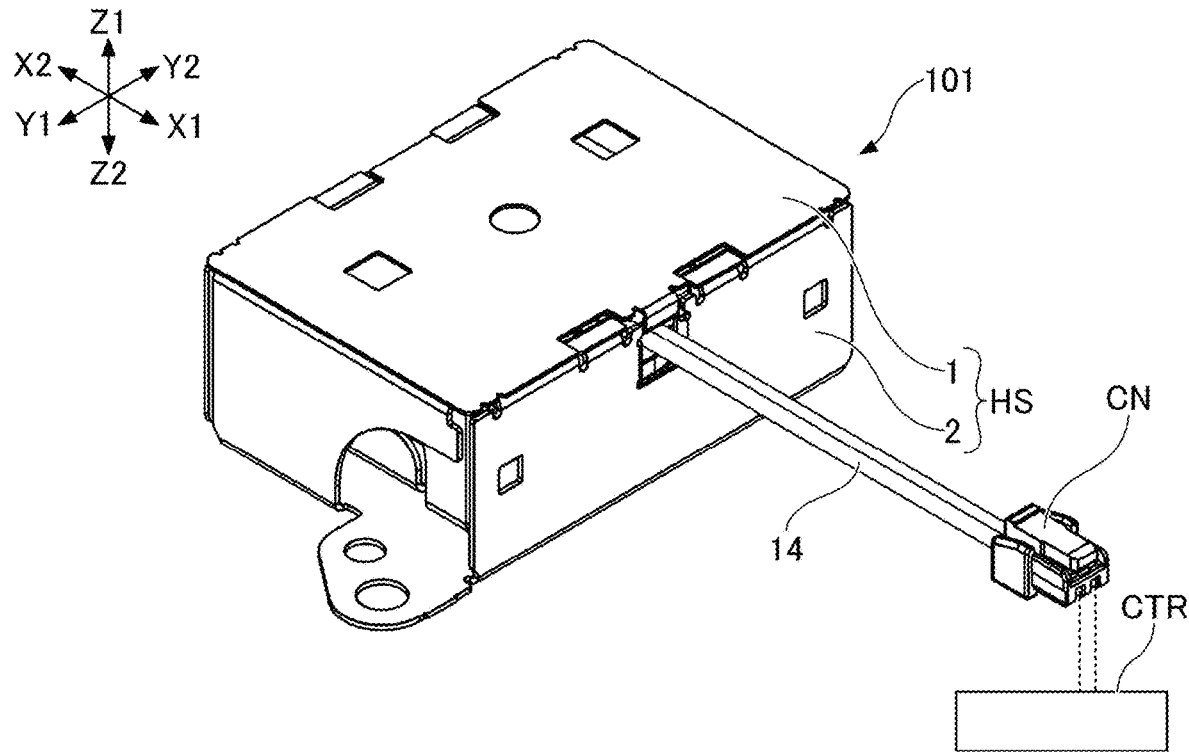
FIG. 1A is a perspective view of a vibration generating device.
Figure 1B:
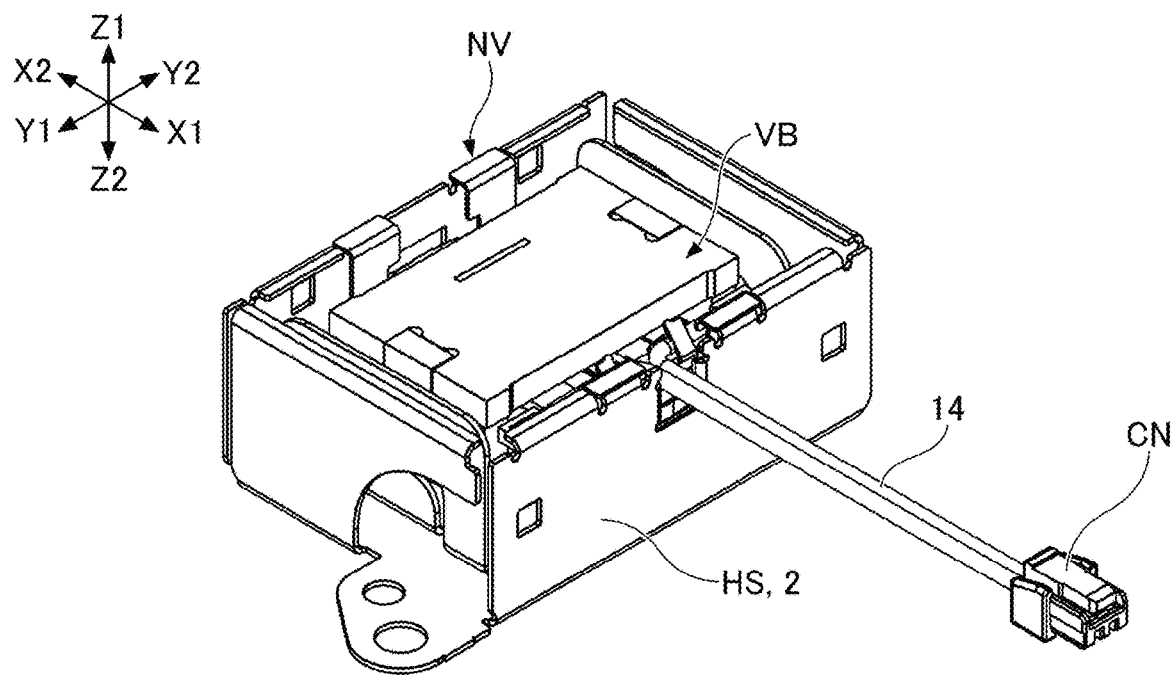
FIG. 1B is a perspective view of the vibration generating device with the cover removed.
Figure 2:
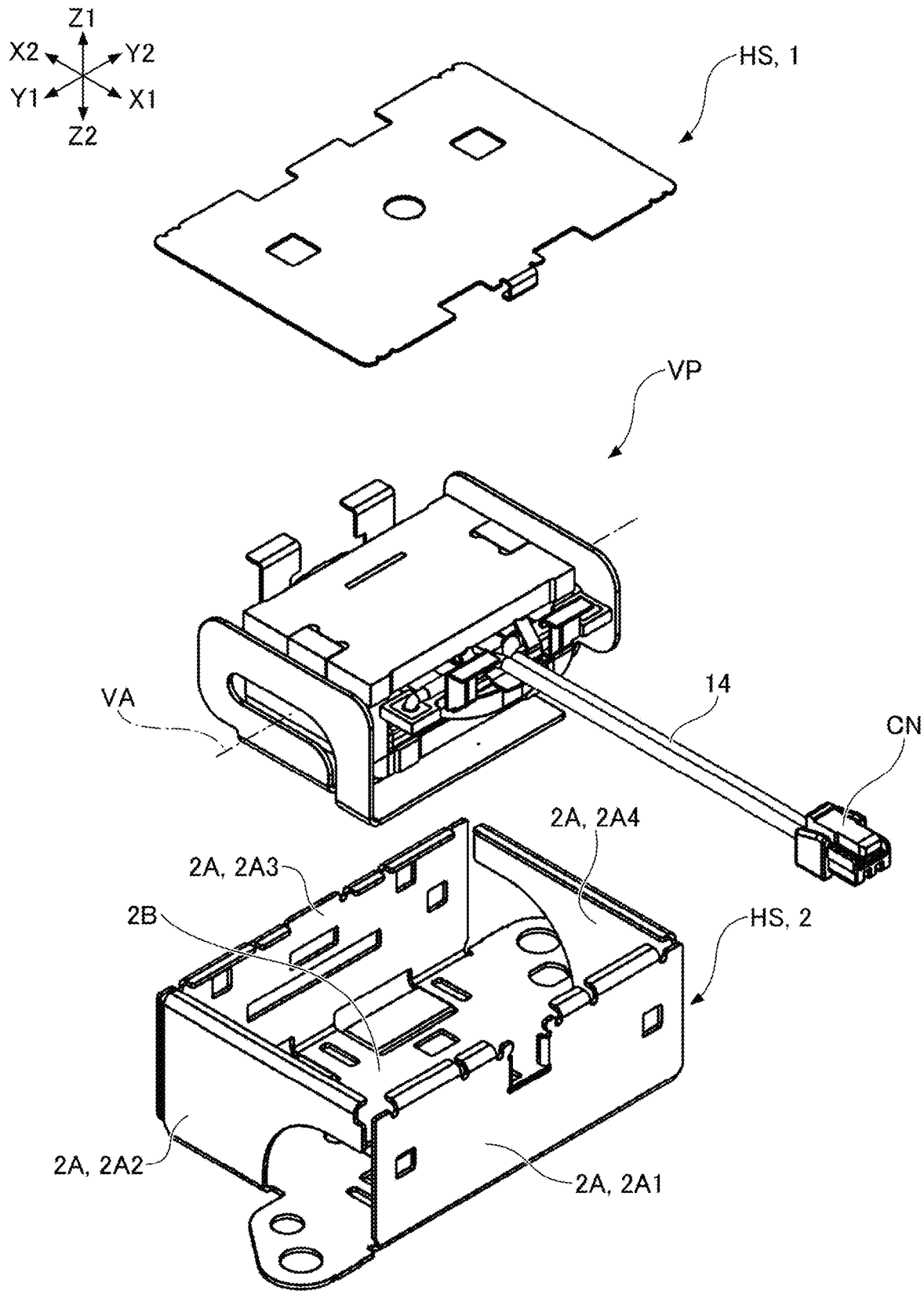
FIG. 2 is an exploded perspective view of the vibration generating device.

Hereinafter, a vibration apparatus VE (vibration generating device 101) according to an embodiment of the present invention will be described with reference to the drawings. FIGS. 1A and 1B are perspective views of the vibration apparatus VE (vibration generating device 101). Specifically, FIG. 1A is a perspective view of the vibration generating device 101 connected to a control unit CTR, and FIG. 1B is a perspective view of the vibration generating device 101 in a state where a cover 1 is removed. FIG. 2 is an exploded perspective view of the vibration generating device 101.

In each of FIG. 1A, FIG. 1B, and FIG. 2, X1 represents one direction of an X-axis and X2 represents the other direction of the X-axis included in a three-dimensional orthogonal coordinate system. Further, Y1 represents one direction of the Y-axis and Y2 represents the other direction of the Y-axis included in the three-dimensional orthogonal coordinate system. Similarly, Z1 represents one direction of the Z-axis and Z2 represents the other direction of the Z-axis included in the three-dimensional orthogonal coordinate system. In the present embodiment, the X1 side of the vibration generating device 101 corresponds to the front side (front surface side) of the vibration generating device 101, and the X2 side of the vibration generating device 101 corresponds to the rear side (rear surface side) of the vibration generating device 101. Further, the Y1 side of the vibration generating device 101 corresponds to the left side of the vibration generating device 101, and the Y2 side of the vibration generating device 101 corresponds to the right side of the vibration generating device 101. The Z1 side of the vibration generating device 101 corresponds to the upper side of the vibration generating device 101, and the Z2 side of the vibration generating device 101 corresponds to the lower side of the vibration generating device 101. The same applies to the other drawings.

The vibration apparatus VE includes the control unit CTR and the vibration generating device 101. The vibration generating device 101 includes a housing HS and a vibration portion VP accommodated in the housing HS.

As illustrated in FIG. 1A, the housing HS has a substantially rectangular parallelepiped outer shape, and is configured such that the areas of the surfaces (upper surface and lower surface) parallel to the XY plane are larger than the areas of the other surfaces (front surface, rear surface, left side surface, and right side surface). In the present embodiment, the housing HS is formed of a non-magnetic material such as stainless steel. The housing HS includes a cover 1 and a case 2.

As illustrated in FIG. 2, the cover 1 is a flat plate-shaped member and is configured to form a top surface of the housing HS. The case 2 is a member capable of accommodating the vibration portion VP, and is configured to form side surfaces and a bottom surface of the housing HS. The case 2 is configured to function as a base that supports the vibration portion VP.

In the present embodiment, the case 2 includes an outer peripheral wall portion 2A having a rectangular tubular shape, and a bottom plate portion 2B having a flat plate shape provided so as to be continuous with a lower end (an end on the Z2 side) of the outer peripheral wall portion 2A.

The outer peripheral wall portion 2A includes four side plate portions formed in a flat plate shape. Specifically, as illustrated in FIG. 2, the outer peripheral wall portion 2A includes a first side plate portion 2A1 and a third side plate portion 2A3 that face each other, and a second side plate portion 2A2 and a fourth side plate portion 2A4 that are each perpendicular to the first side plate portion 2A1 and the third side plate portion 2A3 and that face each other.

The control unit CTR is configured to control the movement of the vibration portion VP. In the present embodiment, the control unit CTR is a device including an electronic circuit and a nonvolatile storage device, and is configured to generate a driving signal for vibrating the vibration portion VP and output the driving signal to the vibration portion VP. The driving signal is, for example, a current signal, a voltage signal, or the like. The control unit CTR may be configured to generate the driving signal in response to a control instruction from an external device such as a computer, or may be configured to generate a driving signal without receiving a control instruction from an external device. In the present embodiment, the control unit CTR is installed outside the housing HS, but may be installed inside the housing HS.

The vibration portion VP is configured to vibrate the housing HS. In the present embodiment, the vibration portion VP is attached inside the housing HS and is configured to vibrate the housing HS.

Figure 3:
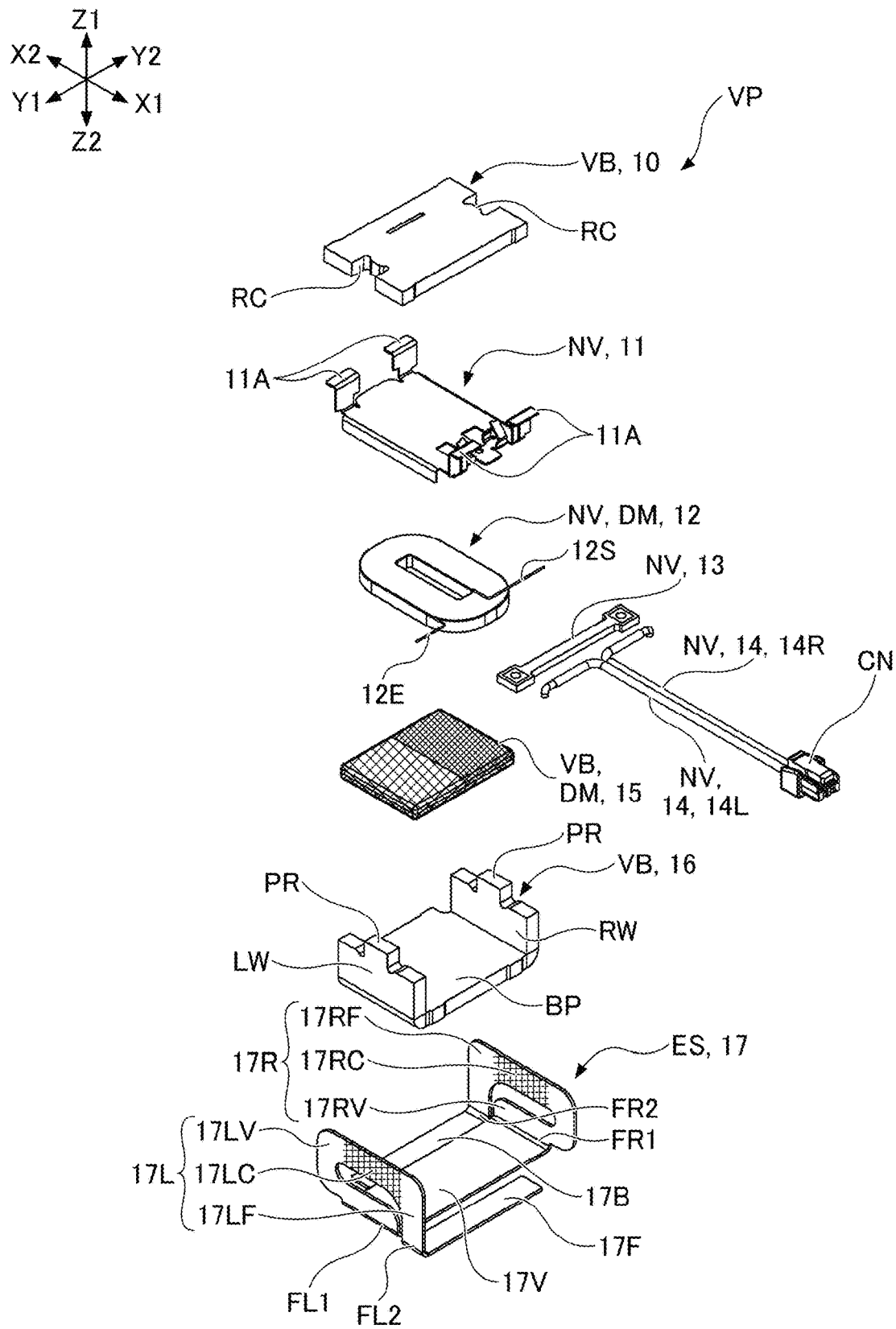
FIG. 3 is an exploded perspective view of a vibration portion.

Next, the vibration portion VP will be described in detail with reference to FIG. 3. FIG. 3 is an exploded perspective view of the vibration portion VP.

The vibration portion VP has a predetermined natural oscillation frequency and includes a vibration body VB, a driving means DM, and an elastic support member ES.

The vibration body VB is configured to vibrate with respect to the housing HS along a vibration axis VA (see FIG. 2) extending in a predetermined direction. In the present embodiment, the vibration body VB is configured to vibrate with respect to the case 2 along a vibration axis VA (see FIG. 2) extending in the Y-axis direction (horizontal direction).

The driving means DM is an example of a vibration force generating unit, and is configured to vibrate the vibration body VB along the vibration axis VA according to a driving signal. In the present embodiment, the driving means DM is configured to vibrate the center of gravity of the vibration body VB, which is elastically supported by the elastic support member ES, along the vibration axis VA in response to a driving signal output from the control unit CTR.

The elastic support member ES is interposed between the housing HS and the vibration body VB and is configured to elastically support the vibration body VB. Specifically, the elastic support member ES is interposed between the case 2 and the vibration body VB and is configured to elastically support the vibration body VB.

More specifically, the vibration portion VP including the vibration body VB, the driving means DM, and the elastic support member ES is configured by an upper yoke 10, a bracket 11, a coil 12, a circuit board 13, a conducting wire 14, a magnet 15, a lower yoke 16, and a plate spring 17. The vibration body VB is configured by the upper yoke 10, the magnet 15, and the lower yoke 16, the driving means DM is configured by the coil 12 and the magnet 15, and the elastic support member ES is configured by the plate spring 17. The bracket 11, the coil 12, the circuit board 13, and the conducting wire 14 configure a non-vibration body NV that does not vibrate together with the vibration body VB. The non-vibration body NV vibrates together with the housing HS but does not vibrate together with the vibration body VB.

The upper yoke 10 is a member included in a top plate portion of the vibration body VB. In the present embodiment, the upper yoke 10 is formed of a magnetic material including iron or the like. Specifically, a recessed portion RC is formed on each of the end surface on the Y1 side and the end surface on the Y2 side of the upper yoke 10 so as to be able to engage with a protruding portion PR formed on the lower yoke 16. The upper yoke 10 may be welded, brazed, adhered (with an adhesive), or the like (hereinafter referred to as "welded or the like"), to be fixed to the lower yoke 16.

The bracket 11 is configured to support the coil 12 in a state where the coil 12 is facing the magnet 15 in a non-contact manner. The bracket 11 is fixed to the case 2 so as not to come into contact with the vibration body VB. In the present embodiment, the bracket 11 is formed of a non-magnetic material such as stainless steel or the like. Specifically, the bracket 11 is fixed to the case 2 by welding or the like via the four coupling portions 11A in an arrangement in which the bracket 11 and the coil 12 do not come into contact with the vibration body VB even when the vibration body VB vibrates. That is, the bracket 11 to which the coil 12 is attached is configured not to vibrate together with the vibration body VB.

The coil 12 is configured to generate a magnetic field by receiving supply of a current. In the example illustrated in FIG. 3, the coil 12 has a substantially elliptical contour having the long axis along the X-axis direction. The coil 12 has a first end portion 12S on the winding start side and a second end portion 12E on the winding end side. The coil 12 is fixed to an Z2 side (lower side) surface of the bracket 11 with an adhesive or the like.

Figure 4A:
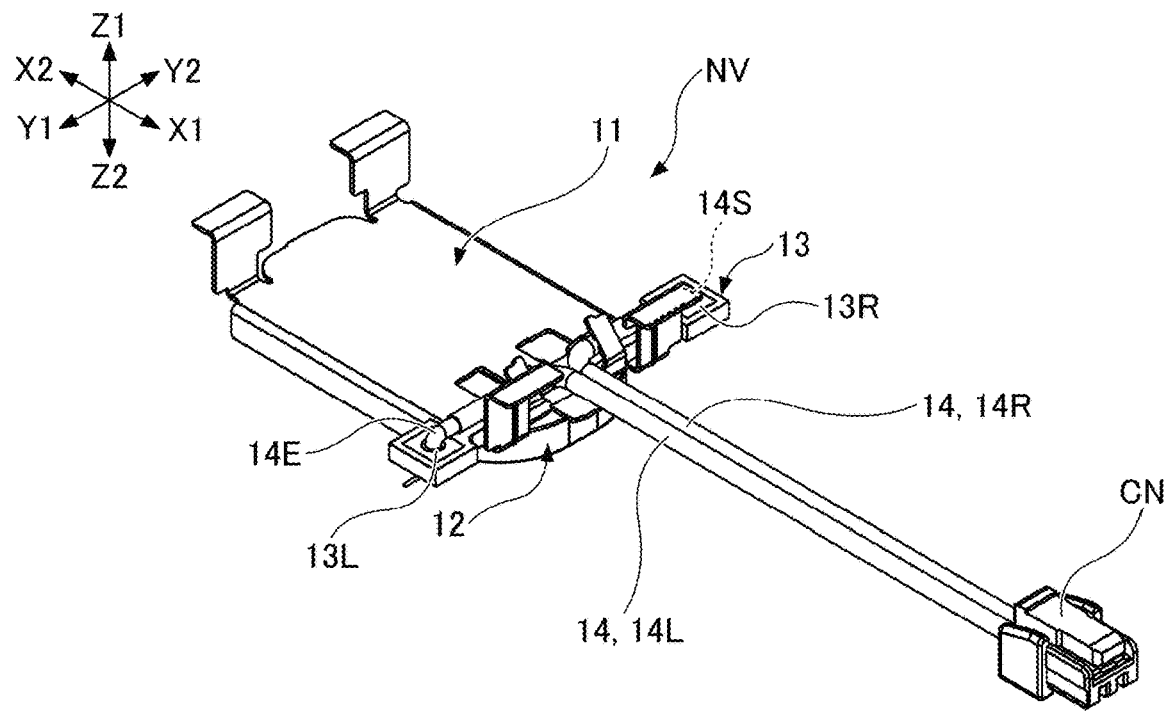
FIG. 4A is a top perspective view of a non-vibration body.
Figure 4B:
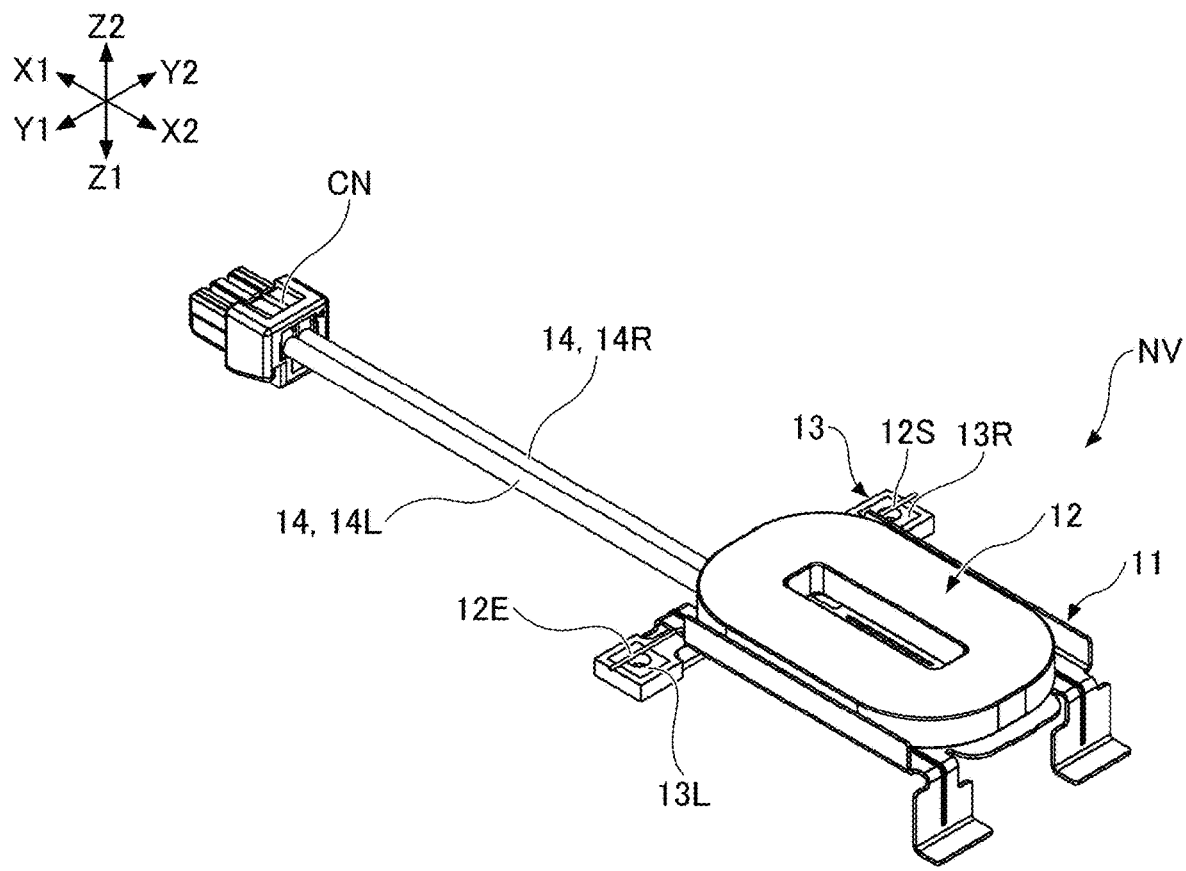
FIG. 4B is a bottom perspective view of the non-vibration body.

A circuit board 13 is a member to which the first end portion 12S and the second end portion 12E of the coil 12 are connected. In the present embodiment, as illustrated in FIGS. 4A and 4B, the circuit board 13 is fixed to the surface of the bracket 11 on the Z1 side (upper side) with an adhesive. FIG. 4A is a top perspective view of the non-vibration body NV, and FIG. 4B is a bottom perspective view of the non-vibration body NV.

The conducting wire 14 is a member for supplying current to the coil 12. In the present embodiment, as illustrated in FIG. 4A, part of the conducting wire 14 is disposed on the Z1 side (upper side) of the circuit board 13, and is electrically connected to the coil 12 via the circuit board 13. Specifically, the conducting wire 14 includes a left conducting wire 14L electrically connected to the first end portion 12S of the coil 12 and a right conducting wire 14R electrically connected to the second end portion 12E of the coil 12.

More specifically, as illustrated in FIG. 4A, one end 14S of a right conducting wire 14R is soldered to a right through-conductor 13R on the Z1 side (upper side) of the circuit board 13, and one end 14E of a left conducting wire 14L is soldered to a left through-conductor 13L on the Z1 side (upper side) of the circuit board 13. As illustrated in FIG. 4B, the right through-conductor 13R is soldered to the first end portion 12S of the coil 12 on the Z2 side (lower side) of the circuit board 13, and the left through-conductor 13L is soldered to the second end portion 12E of the coil 12 on the Z2 side (lower side) of the circuit board 13.

The other end of each of the left conducting wire 14L and the right conducting wire 14R is connected to the connector CN, and is connected to the control unit CTR via the connector CN.

The magnet 15 configures the driving means DM together with the coil 12. In the present embodiment, the magnet 15 is a four pole permanent magnet having a substantially rectangular parallelepiped outer shape. In FIG. 3, for the sake of clarification, the N-pole of the four pole permanent magnet is given a cross pattern, and the S-pole is given a dot pattern. The same applies to the other drawings. In the example illustrated in FIG. 3, the magnet 15 has an N-pole on the Y1 side and an S-pole on the Y2 side on the surface on the Z1 side, and has an S-pole on the Y1 side and an N-pole on the Y2 side on the Z2 side.

The lower yoke 16 is a member included in a bottom wall portion and a side wall portion of the vibration body VB. In the present embodiment, the lower yoke 16 is formed of a magnetic material containing iron or the like, similar to the upper yoke 10. More specifically, the protruding portion PR is formed on the end surface on the Z1 side of each of the two side walls of the lower yoke 16 so as to be able to engage with the recessed portion RC formed in the upper yoke 10.

The plate spring 17 is an example of the elastic support member ES configured to be interposed between the housing HS and the vibration body VB so as to elastically support the vibration body VB. In the present embodiment, the plate spring 17 is formed by punching and bending one non-magnetic stainless steel metal plate having a thickness of 0.1 mm, for example.

Specifically, as illustrated in FIG. 3, the plate spring 17 includes a rear fixed plate portion 17B, a front fixed plate portion 17F, a left elastic plate portion 17L, a right elastic plate portion 17R, and a vibration plate portion 17V.

The vibration plate portion 17V is configured to support the vibration body VB. In the illustrated example, the vibration body VB is fixed to the Z1 side (upper side) surface of the vibration plate portion 17V by welding or the like.

The rear fixed plate portion 17B is disposed behind the vibration plate portion 17V and is fixed to the housing HS. In the illustrated example, the rear fixed plate portion 17B is fixed to the bottom plate portion 2B of the case 2 by welding or the like.

The front fixed plate portion 17F is disposed in front of the vibration plate portion 17V and is configured to be fixed to the housing HS. In the illustrated example, the front fixed plate portion 17F is fixed to the bottom plate portion 2B of the case 2 by welding or the like.

The left elastic plate portion 17L is configured to extend upward from one end of each of the vibration plate portion 17V and the front fixed plate portion 17F. In the illustrated example, the left elastic plate portion 17L includes a left inner plate portion 17LV extending upward from the left end of the vibration plate portion 17V via a fold line FL1 along the front-rear direction formed at the left end of the vibration plate portion 17V, a left outer plate portion 17LF extending upward from one end (left end) of the front fixed plate portion 17F via a fold line FL2 along the front-rear direction formed at one end (left end) of the front fixed plate portion 17F, and a left connecting portion 17LC that connects the left inner plate portion 17LV and the left outer plate portion 17LF. The left elastic plate portion 17L is configured such that the left inner plate portion 17LV, the left outer plate portion 17LF, and the left connecting portion 17LC are located on the same plane. In FIG. 3, a fine cross pattern is added to the left connecting portion 17LC for the sake of clarification.

The right elastic plate portion 17R is configured to extend upward from the other end of each of the vibration plate portion 17V and the rear fixed plate portion 17B. In the illustrated example, the right elastic plate portion 17R includes a right inner plate portion 17RV extending upward from the right end of the vibration plate portion 17V via a fold line FR1 along the front-rear direction formed at the right end of the vibration plate portion 17V, a right outer plate portion 17RF extending upward from one end (right end) of the rear fixed plate portion 17B via a fold line FR2 along the front-rear direction formed at the one end (right end) of the rear fixed plate portion 17B, and a right connecting portion 17RC that connects the right inner plate portion 17RV and the right outer plate portion 17RF. The right elastic plate portion 17R is configured such that the right inner plate portion 17RV, the right outer plate portion 17RF, and the right connecting portion 17RC are located on the same plane. In FIG. 3, a fine cross pattern is added to the right connecting portion 17RC for the sake of clarification.

Figure 5:
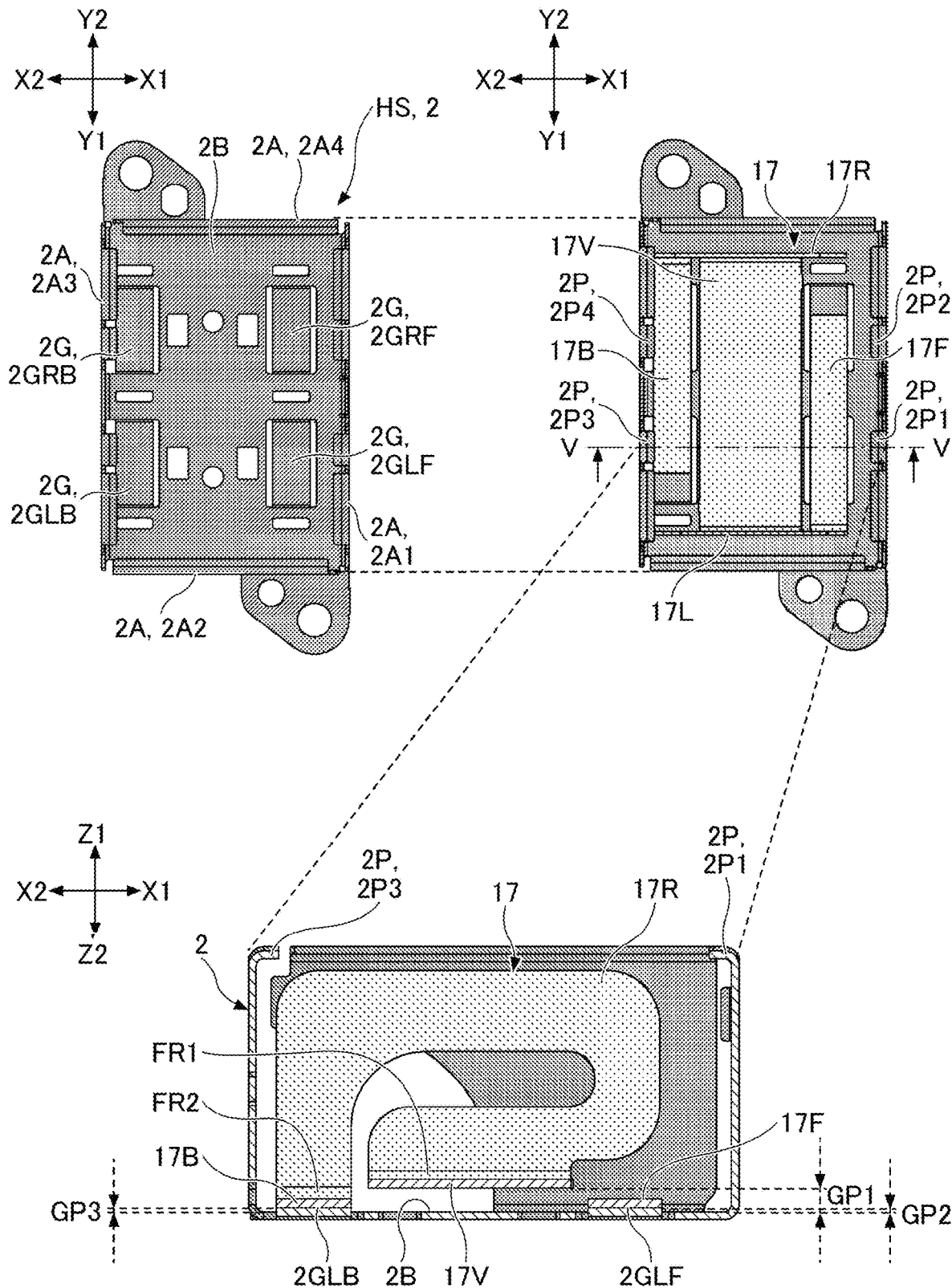
FIG. 5 is a diagram of the case.

Further, as illustrated in FIG. 5, the rear fixed plate portion 17B and the front fixed plate portion 17F of the plate spring 17 are fixed to a raised portion 2G formed on the bottom plate portion 2B of the case 2 by welding or the like. That is, the plate spring 17 is attached to the case 2 via the rear fixed plate portion 17B and the front fixed plate portion 17F in a state where gaps are formed between the bottom plate portion 2B of the case 2 and the vibration plate portion 17V so that the vibration plate portion 17V, the left elastic plate portion 17L, and the right elastic plate portion 17R do not come into contact with the case 2.

FIG. 5 is a diagram of the case 2. Specifically, the upper left diagram of FIG. 5 is a top view of the case 2 to which the plate spring 17 is not attached, and the upper right diagram of FIG. 5 is a top view of the case 2 to which the plate spring 17 is attached. The lower part of FIG. 5 is a cross-sectional view of the case 2 to which the plate spring 17 is attached. More specifically, the lower diagram of FIG. 5 is a diagram in which when a cross section of the case 2 and the plate spring 17 in a plane parallel to the XZ plane including the dash-dot-dash line (cutting line V-V) in the upper right diagram of FIG. 5 is viewed from the Y1 side as indicated by arrows. In FIG. 5, for the sake of clarification, the case 2 is provided with a fine dot pattern, and the plate spring 17 is provided with a coarse dot pattern.

In the present embodiment, as illustrated in the upper left diagram of FIG. 5, the raised portion 2G includes a left front raised portion 2GLF, a right front raised portion 2GRF, a left rear raised portion 2GLB, and a right rear raised portion 2GRB.

As illustrated in the upper right diagram and the lower diagram of FIG. 5, the front fixed plate portion 17F of the plate spring 17 is fixed to the bottom plate portion 2B of the case 2 by being welded at two locations, i.e., the left front raised portion 2GLF and the right front raised portion 2GRF. Similarly, the rear fixed plate portion 17B of the plate spring 17 is fixed to the bottom plate portion 2B of the case 2 by being welded at two locations, i.e., the left rear raised portion 2GLB and the right rear raised portion 2GRB.

Figure 6:
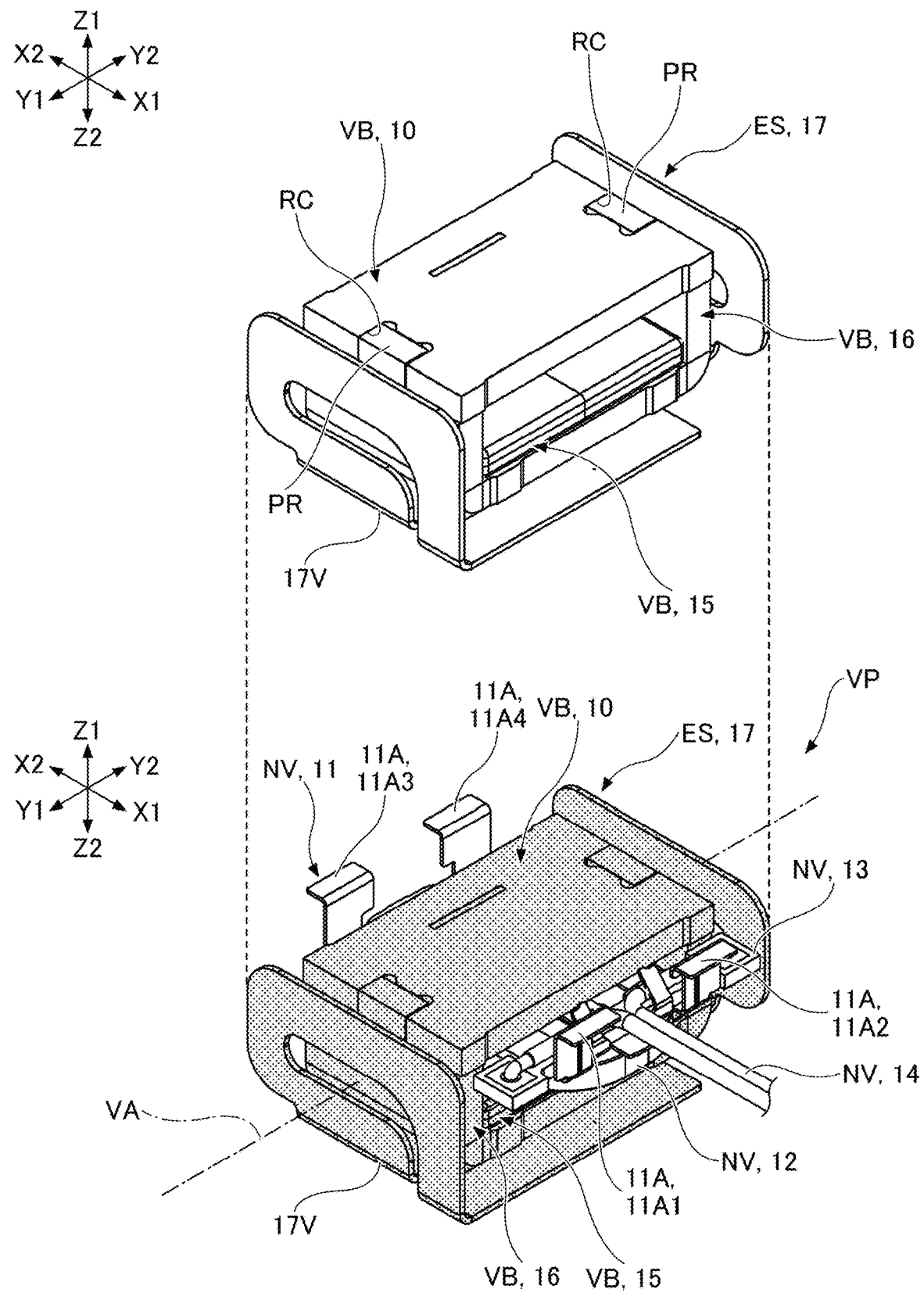
FIG. 6 is a perspective view of a vibration portion.

As illustrated in FIG. 6, the vibration body VB is welded to the vibration plate portion 17V of the plate spring 17. FIG. 6 is a perspective view of the vibration portion VP. Specifically, the upper diagram of FIG. 6 is a perspective view of the vibration portion VP in a state in which illustration of the non-vibration body NV (the bracket 11, the coil 12, the circuit board 13, and the conducting wire 14) is omitted, and the lower diagram of FIG. 6 is a perspective view of the vibration portion VP in a state in which the non-vibration body NV is illustrated. Note that, in the lower diagram of FIG. 6, for the sake of clarification, a dot pattern is given to portions that vibrate (the vibration body VB and the elastic support member ES). This indicates that the non-vibration body NV is fixed to the case 2 (not illustrated in FIG. 6) so as not to come into contact with the vibration body VB. FIG. 1B illustrates the non-vibration body NV fixed to the case 2 so as not to come into contact with the vibration body VB.

Specifically, as illustrated in the upper diagram in FIG. 6, the vibration body VB is configured by the upper yoke 10, the magnet 15, and the lower yoke 16. The surface on the Z2 side (lower side) of the lower yoke 16 is welded to the surface on the Z1 side (upper side) of the vibration plate portion 17V.

When a voltage is applied to the coil 12 via the conducting wire 14 and the circuit board 13 in the state illustrated in the lower diagram of FIG. 6, the vibration body VB vibrates along the vibration axis VA.

Figure 7A:
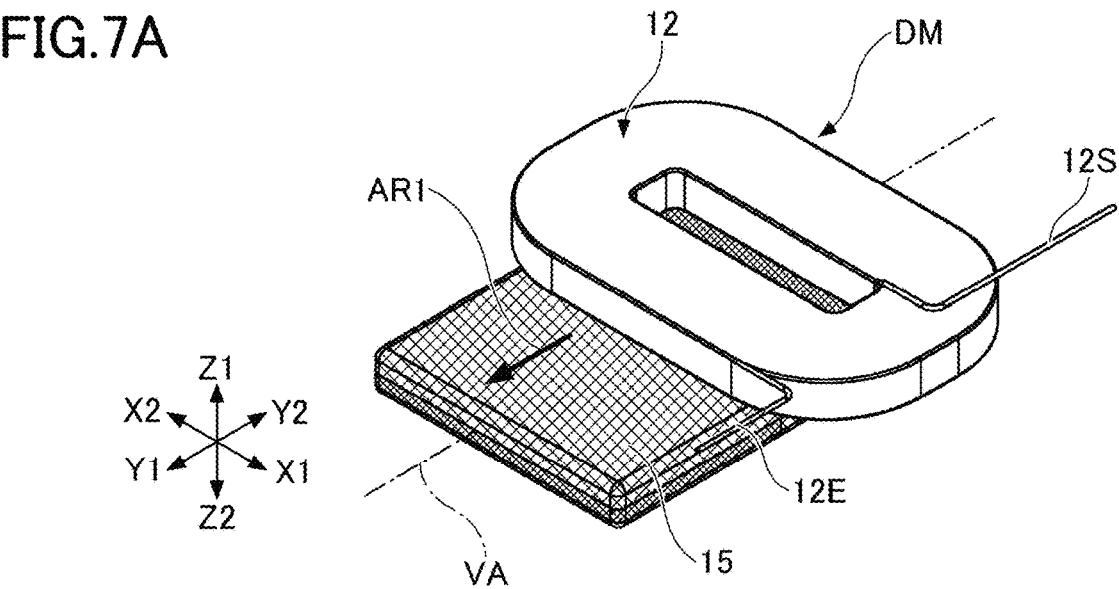
FIGS. 7A to 7C are perspective views of the components of the driving means.
Figure 7B:
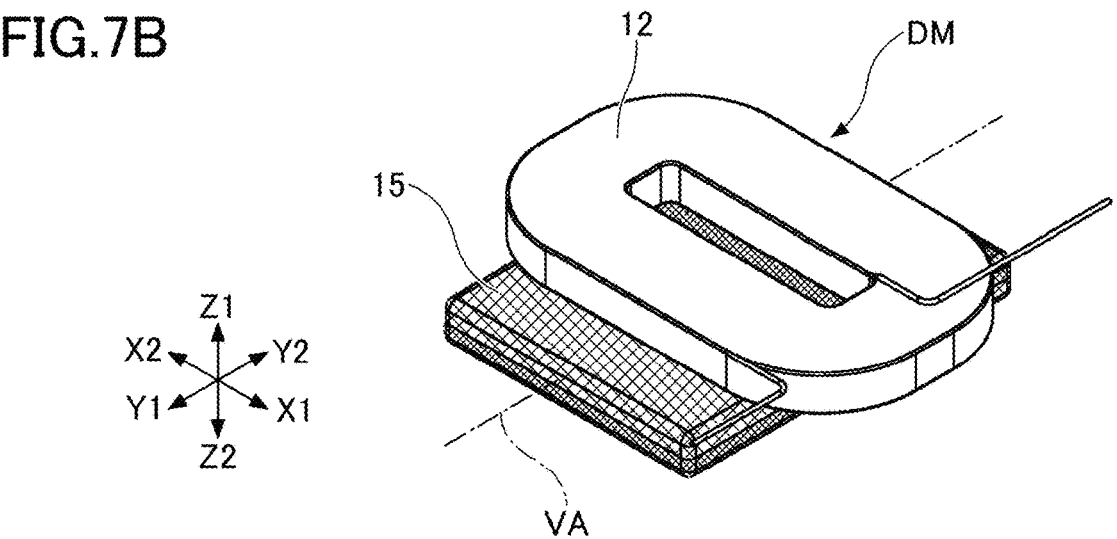
Figure 7C:
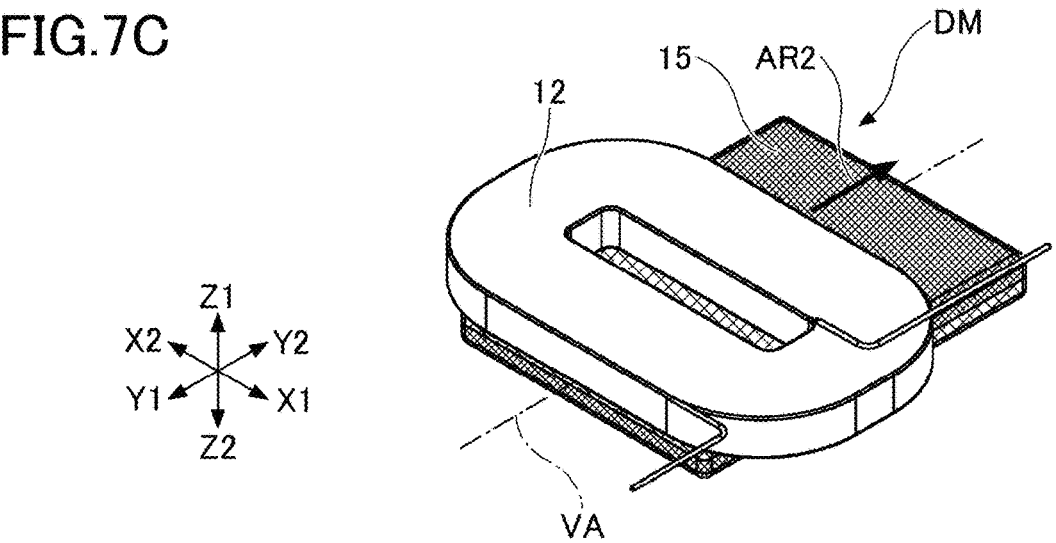

Here, with reference to FIGS. 7A to 7C, the positional relationship of the elements of the driving means DM when the vibration body VB vibrates along the vibration axis VA will be described. FIGS. 7A to 7C are perspective views of the elements of the driving means DM. Specifically, FIG. 7A illustrates the positional relationship between the coil 12 and the magnet 15 when the vibration body VB (the magnet 15) has moved to the Y1-most side (left side). FIG. 7B illustrates the positional relationship between the coil 12 and the magnet 15 when the vibration body VB (the magnet 15) is stationary (when no current flows through the coil 12). FIG. 7C illustrates the positional relationship between the coil 12 and the magnet 15 when the vibration body VB (the magnet 15) has moved to the Y2-most side (right side).

When no voltage is applied to the coil 12 and no current flows through the coil 12, the coil 12 does not generate a magnetic field, and thus no repulsive force or attractive force is generated between the coil 12 and the magnet 15. Therefore, as illustrated in FIG. 7B, the magnet 15 is positioned such that the center thereof faces the center of the coil 12.

When a current flows from the second end portion 12E toward the first end portion 12S of the coil 12, the coil 12 generates a magnetic field such that the Z1 side becomes an S-pole and the Z2 side becomes an N-pole. As a result, the S-pole portion on the surface of the magnet 15 on the Z1 side is attracted to the coil 12, and the N-pole portion on the surface of the magnet 15 on the Z1 side is moved away from the coil 12, so that the vibration body VB (the magnet 15) moves to the Y1 side (left side) as indicated by an arrow AR1 in FIG. 7A.

Conversely, when a current flows from the first end portion 12S toward the second end portion 12E of the coil 12, the coil 12 generates a magnetic field such that the Z1 side becomes an N-pole and the Z2 side becomes an S-pole. As a result, the N-pole portion of the surface of the magnet 15 on the Z1 side is attracted to the coil 12, and the S-pole portion of the surface of the magnet 15 on the Z1 side is moved away from the coil 12, so that the vibration body VB (the magnet 15) moves to the Y2 side (right side) as indicated by an arrow AR2 in FIG. 7C.

The control unit CTR can alternately reverse the direction of the magnetic field generated by the coil 12 by alternately reversing the direction of the current flowing through the coil 12, and as a result, the control unit CTR can vibrate the vibration body VB (the magnet 15) along the Y-axis direction.

Figure 8A:
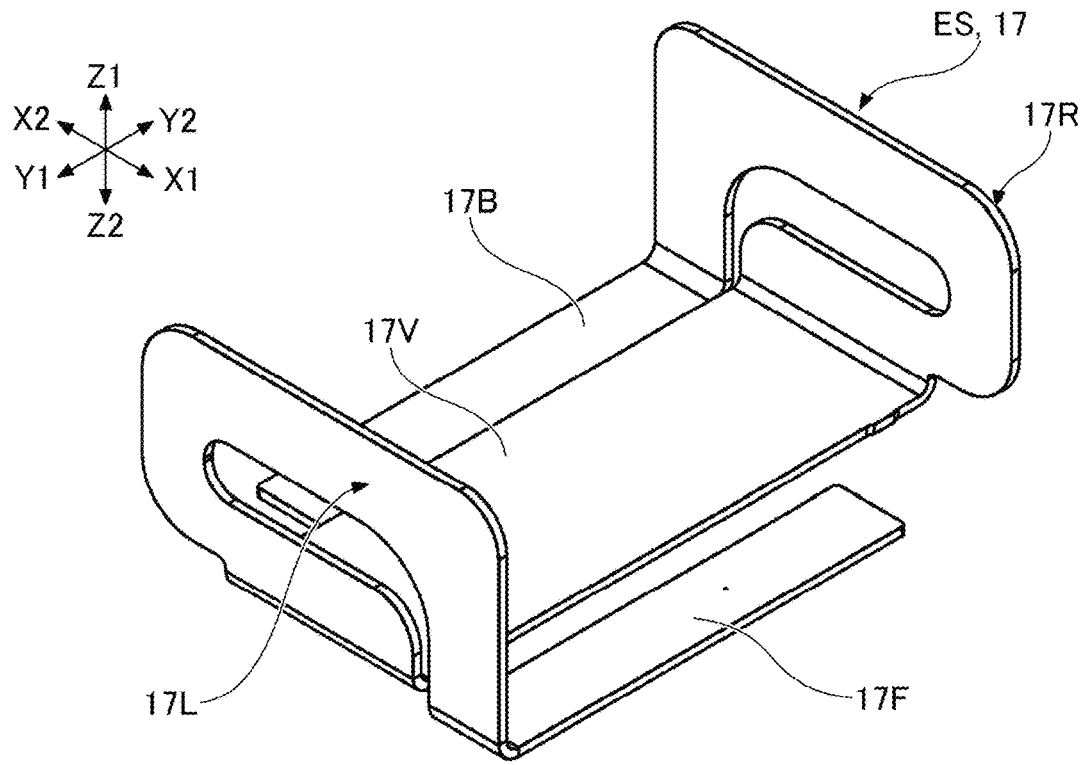
FIGS. 8A and 8B are perspective views of a plate spring.
Figure 8B:
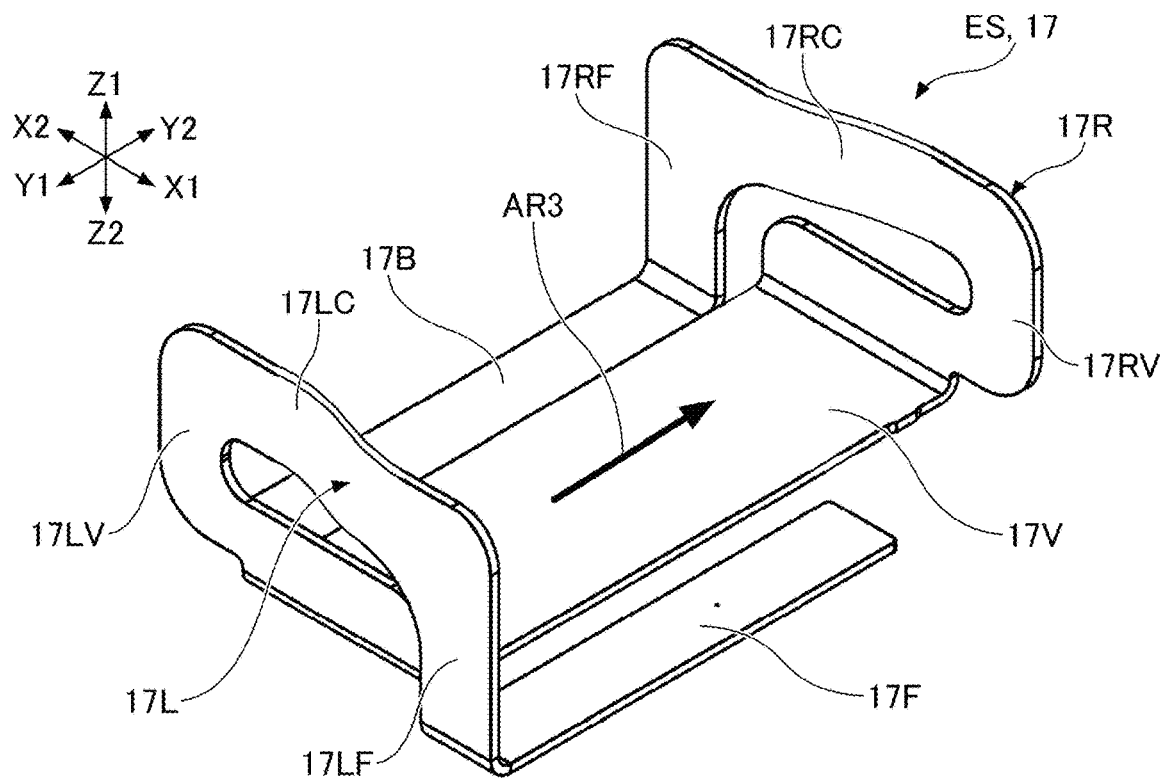

Next, the movement (deformation) of the left elastic plate portion 17L and the right elastic plate portion 17R when the vibration body VB vibrates will be described with reference to FIGS. 8A and 8B. FIGS. 8A and 8B are perspective views of the plate spring 17. Specifically, FIG. 8A illustrates the state of the plate spring 17 when no current flows through the coil 12, that is, when the vibration body VB does not vibrate. FIG. 8B illustrates the state of the plate spring 17 when the vibration body VB has moved to the Y2 side (right side).

As illustrated in FIG. 8A, the left elastic plate portion 17L is provided between the front fixed plate portion 17F and the vibration plate portion 17V, and the right elastic plate portion 17R is provided between the rear fixed plate portion 17B and the vibration plate portion 17V.

When the vibration body VB (not illustrated in FIGS. 8A and 8B) is moved in the direction indicated by the arrow AR3 by the driving means DM, the left elastic plate portion 17L and the right elastic plate portion 17R are bent as illustrated in FIG. 8B, thereby enabling translation of the vibration body VB in the Y2 direction.

In contrast, when the vibration body VB is moved in the direction (Y1 direction) opposite to the direction (Y2 direction) indicated by the arrow AR3 by the driving means DM, the left elastic plate portion 17L and the right elastic plate portion 17R are bent in the direction opposite to the bending direction illustrated in FIG. 8B, thereby enabling translation of the vibration body VB in the Y1 direction.

In the illustrated example, the plate spring 17 is configured to bend most largely at the left connecting portion 17LC and the right connecting portion 17RC, but may be configured to bend most largely at the left outer plate portion 17LF and the right outer plate portion 17RF, or may be configured to bend most largely at the left inner plate portion 17LV and the right inner plate portion 17RV.

Referring again to FIG. 3, the lower yoke 16 will now be described in greater detail. The lower yoke 16 has a bottom wall portion BP, a right side wall portion RW, and a left side wall portion LW. Specifically, a left side wall portion LW extending in the Z1 direction is formed at an end portion on the Y1 side of the bottom wall portion BP, and a right side wall portion RW extending in the Z1 direction is formed at an end portion on the Y2 side of the bottom wall portion BP. The protruding portion PR is formed at the upper end of each of the left side wall portion LW and the right side wall portion RW so as to be able to engage with the recessed portion RC formed in the upper yoke 10. The upper drawing of FIG. 6 illustrates a state in which the recessed portion RC formed in the upper yoke 10 and the protruding portion PR of the lower yoke 16 are engaged with each other.

When assembling the vibration body VB, the magnet 15 is attached to the bottom wall portion BP of the lower yoke 16, and the protruding portion PR of the lower yoke 16 and the recessed portion RC of the upper yoke 10 are engaged with each other. As described above, in the present embodiment, the vibration body VB is configured such that the lower yoke 16 surrounding the magnet 15 and the upper yoke 10 are separate members so as to facilitate assembly. The magnet 15 is fixed to the bottom wall portion BP of the lower yoke 16 by the magnetic force thereof, but may be fixed to the bottom wall portion BP by welding or the like.

As illustrated in the upper part of FIG. 6, the surface of the magnet 15 on the Z2 side is joined to the surface of the lower yoke 16 on the Z1 side. In the space surrounded by the upper yoke 10 and the lower yoke 16, as illustrated in the lower drawing of FIG. 6, the coil 12 fixed to the bracket 11 is installed closer to the Z1 side than the magnet 15 in a non-contact state with respect to the magnet 15.

The bracket 11 is attached to the case 2 by engaging to the coupling portion 11A (see the lower drawing of FIG. 6) provided on the bracket 11 with a support portion 2P (see the upper right drawing of FIG. 5) provided in the case 2. Specifically, the coupling portion 11A includes a first coupling portion 11A1 to a fourth coupling portion 11A4. Further, the support portion 2P includes a first support portion 2P1 to a fourth support portion 2P4. The first coupling portion 11A1 is engaged with the first support portion 2P1 provided in the first side plate portion 2A1 included in the outer peripheral wall portion 2A of the case 2, and the second coupling portion 11A2 is engaged with the second support portion 2P2 provided in the first side plate portion 2A1. Similarly, the third coupling portion 11A3 is engaged with the third support portion 2P3 provided in the third side plate portion 2A3 included in the outer peripheral wall portion 2A of the case 2, and the fourth coupling portion 11A4 is engaged with the fourth support portion 2P4 provided in the third side plate portion 2A3.

Next, the magnetic force generated by the magnet 15 will be described with reference to FIG. 9. FIG. 9 is a front view of the vibration body VB. Specifically, FIG. 9 illustrates the vibration body VB configured by the upper yoke 10, the magnet 15, and the lower yoke 16, and the coil 12 installed inside a space surrounded by the upper yoke 10 and the lower yoke 16. The magnet 15 generates a magnetic force as indicated by a magnetic force line MF indicated by a dotted line in FIG. 9. In the example illustrated in FIG. 9, the magnetic force line MF includes a first magnetic force line MF1 to a fourth magnetic force line MF4.

Specifically, on the Y1 side of the magnet 15, the first magnetic force line MF1 exits from the N-pole portion on the Z1 side, passes through the space between the N-pole portion on the Y1 side of the magnet 15 and the upper yoke 10, the upper yoke 10, and the left side wall portion LW and the bottom wall portion BP of the lower yoke 16, and enters into the S-pole portion on the Z2 side of the magnet 15. On the Y2 side of the magnet 15, the second magnetic force line MF2 exits from the N-pole portion on the Z2 side, passes through the bottom wall portion BP and the right side wall portion RW of the lower yoke 16, the upper yoke 10, and the space between the upper yoke 10 and the S-pole portion on the Z1 side of the magnet 15, and enters the S-pole portion on the Z1 side of the magnet 15. On the Z1 side of the magnet 15, the third magnetic force line MF3 exits from the N-pole portion on the Z1 side of the magnet 15 and enters the S-pole portion on the Z1 side of the magnet 15. On the Z2 side of the magnet 15, the fourth magnetic force line MF4 exits from the N-pole portion on the Z2 side of the magnet 15 and enters the S-pole portion on the Z2 side of the magnet 15.

Therefore, in the space surrounded by the upper yoke 10 and the lower yoke 16, magnetic force lines are concentrated in a partial space between the upper yoke 10 and the magnet 15 such that the magnetic flux density is increased, and the coil 12 is installed in this partial space. Therefore, by causing a current to flow between the first end portion 12S and the second end portion 12E of the coil 12, the vibration body VB can be efficiently vibrated along the Y-axis direction.

For example, when a current flows from the first end portion 12S toward the second end portion 12E of the coil 12, the vibration body VB moves to the Y2 side (right side). When a current flows from the second end portion 12E toward the first end portion 12S of the coil 12, the vibration body VB moves to the Y1 side (left side). Therefore, the control unit CTR can cause the vibration body VB to vibrate along the vibration axis VA by causing a current to flow through the coil 12 such that the direction of the current flowing through the coil 12 is alternately reversed. The bracket 11 (not illustrated in FIG. 9) to which the coil 12 is attached is fixed to the case 2 and is not fixed to the vibration body VB, and, therefore, the bracket 11 and the coil 12 do not vibrate together with the vibration body VB.

Figure 10:
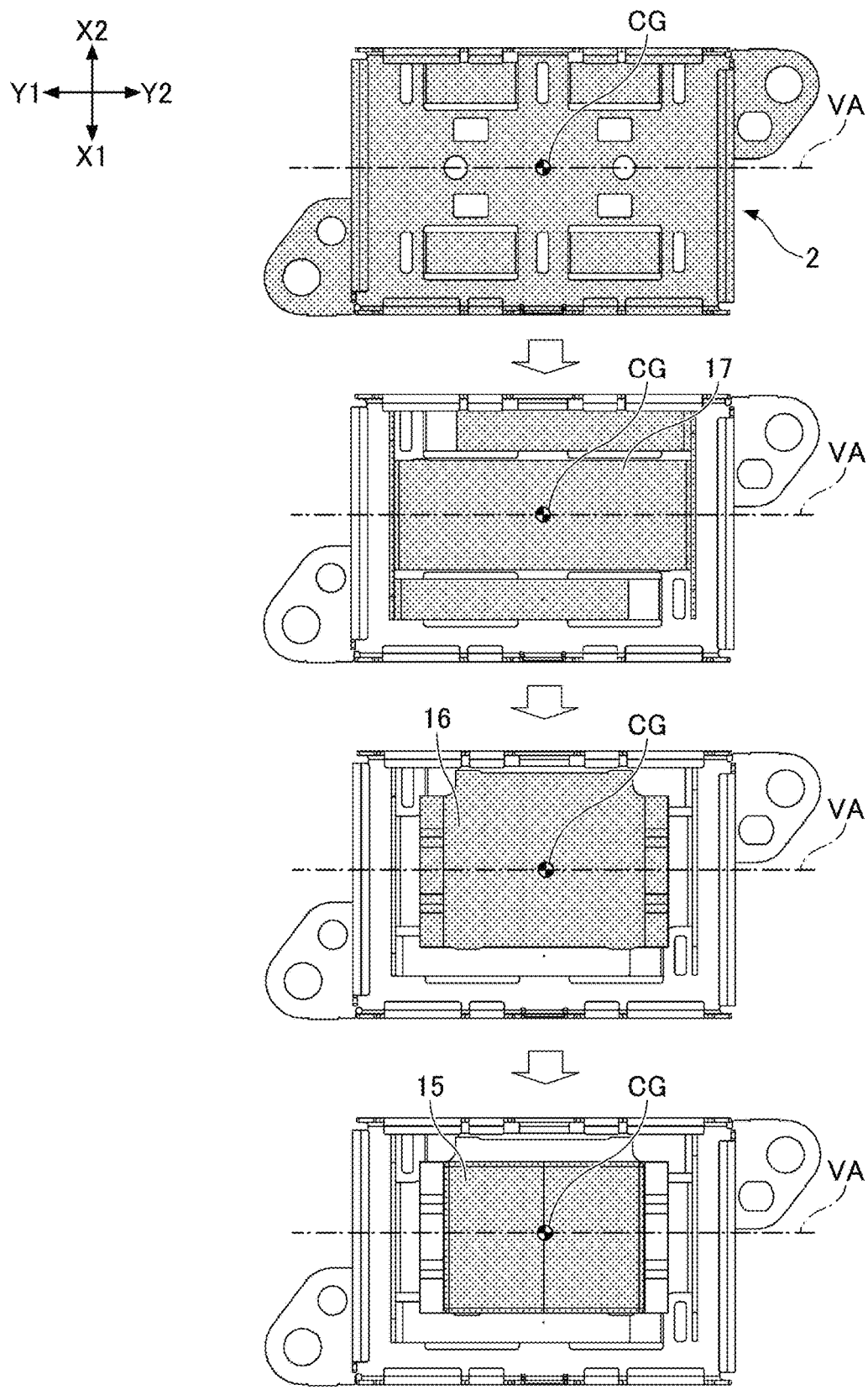
FIG. 10 is a top view of members included in the vibration generating device.

Next, with reference to FIGS. 10, 11, 12A, and 12B, the positional relationship between each member included in the vibration generating device 101 and the center of gravity CG of the vibration body VB will be described. FIG. 10 is a top view of each member included in the vibration generating device 101, and includes four diagrams from the first diagram at the top to the fourth diagram at the bottom. The first to fourth diagrams in FIG. 10 illustrate how the members are mounted in sequential order. The same applies to FIG. 11. In the illustrated example, the vibration axis VA of the vibration body VB passes through the center of gravity CG. Note that in FIGS. 10 and 11, the newly attached members in each of first to fourth diagrams are marked with a dot pattern for clarification.

Specifically, the first diagram (uppermost diagram) in FIG. 10 is a top view of the case 2, the second diagram (second diagram from the top) in FIG. 10 is a top view of the case 2 to which the plate spring 17 is attached, the third diagram (third diagram from the top) in FIG. 10 is a top view of the case 2 to which the lower yoke 16 is further attached, and the fourth diagram (bottommost diagram) in FIG. 10 is a top view of the case 2 to which the magnet 15 is further attached.

Figure 11:
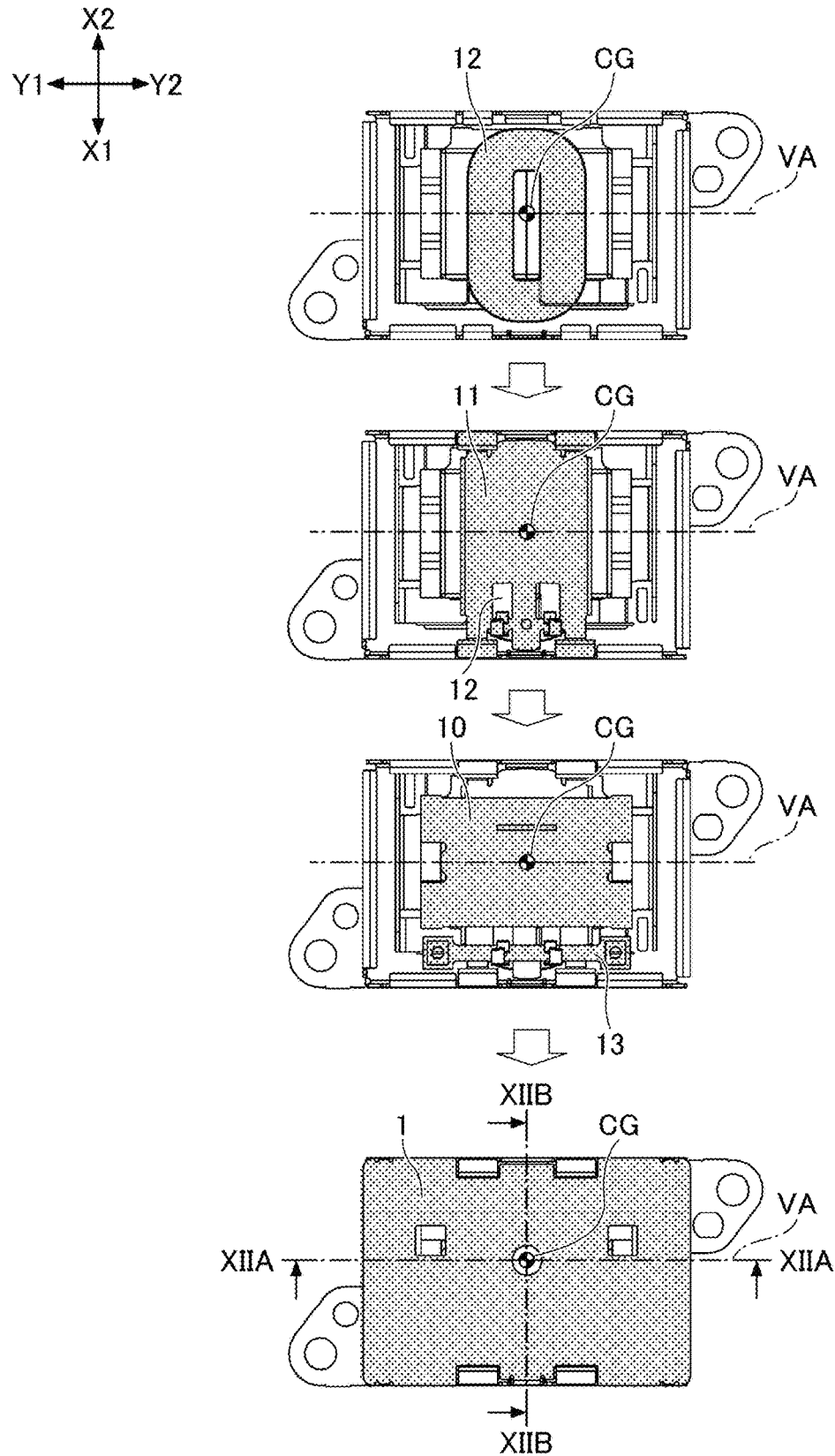
FIG. 11 is a top view of members included in the vibration generating device.

The first diagram in FIG. 11 illustrates the arrangement of the coil 12 in the case 2. However, in the first diagram in FIG. 11, the coil 12 is not attached to any member. The second diagram of FIG. 11 is a top view of the case 2 to which the bracket 11 holding the coil 12 is further attached. The coil 12 is attached to the lower surface of the bracket 11. The third diagram of FIG. 11 is a top view of the case 2 to which the upper yoke 10 and the circuit board 13 are further attached. The fourth diagram of FIG. 11 is a top view of the case 2 to which the cover 1 is further attached.

Figure 12A:
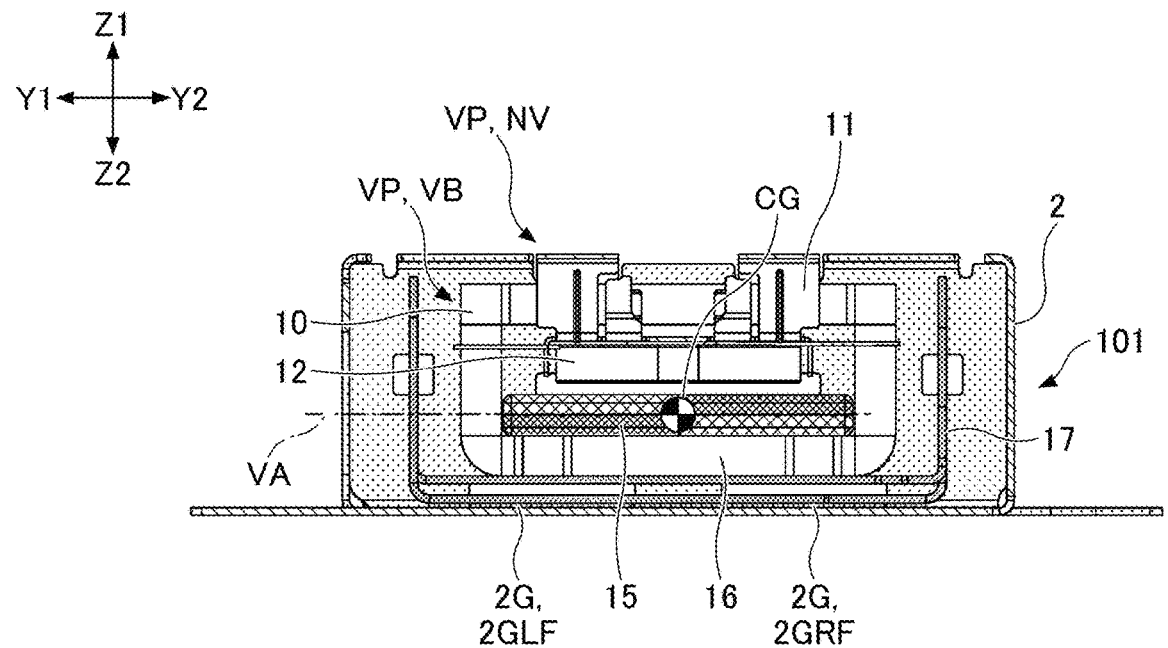
FIG. 12A is a cross-sectional view of the vibration generating device.
Figure 12B:
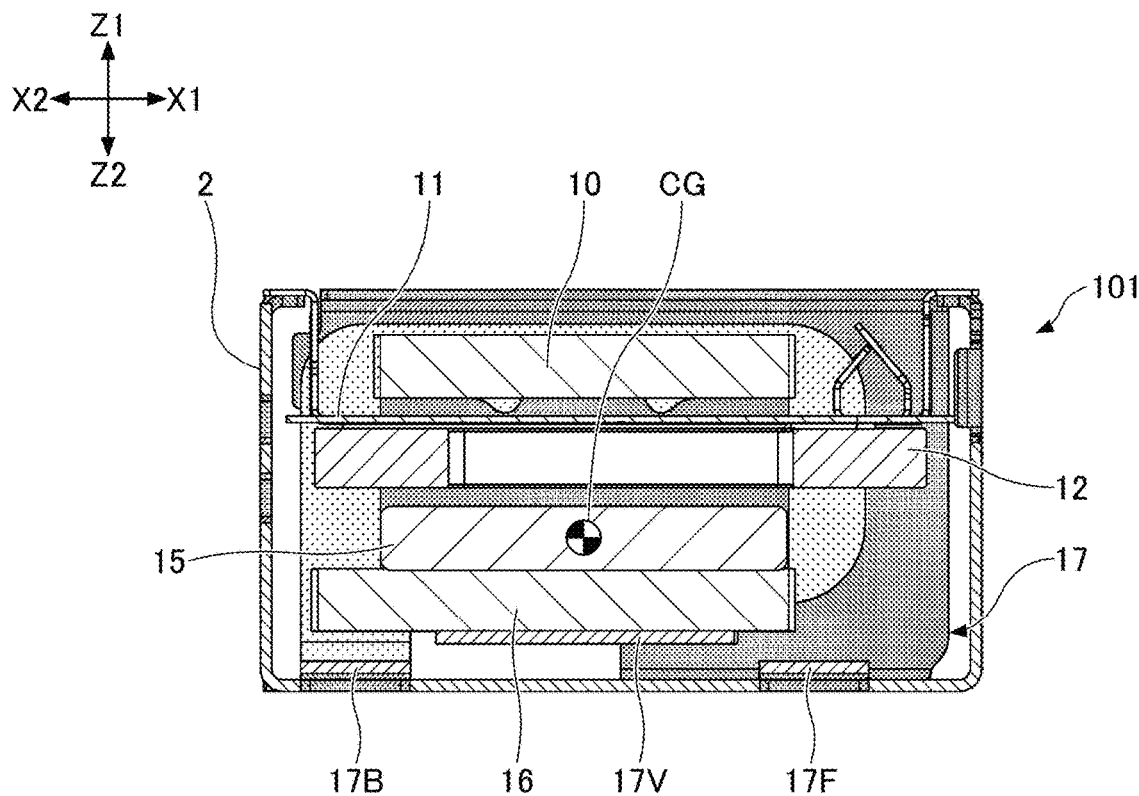
FIG. 12B is a cross-sectional view of the vibration generating device.

FIGS. 12A and 12B are cross-sectional views of the vibration generating device 101. More specifically, FIG. 12A is a view of the cross-section of the vibration generating device 101 in a plane parallel to the YZ plane including the one dot chain line (cross-sectional line XIIA-XIIA) in the fourth diagram in FIG. 11, when viewed from the X1 side as indicated by the arrows. FIG. 12B is a view of the cross-section of the vibration generating device 101 in a plane parallel to the XZ plane including a two dot chain line (cross-sectional line XIIB-XIIB) in the fourth diagram in FIG. 11, when viewed from the Y1 side as indicated by arrows. In FIGS. 12A and 12B, for the sake of clarification, the case 2 is provided with a coarse dot pattern and the plate spring 17 is provided with a fine dot pattern. In FIGS. 12A and 12B, the circuit board 13 and the conducting wire 14 are not illustrated for clarity.

As illustrated in FIGS. 10, 11, 12A, and 12B, the vibration body VB is configured such that the center of gravity CG is located on the vibration axis VA.

In the present embodiment, the vibration body VB is attached to the case 2 via the plate spring 17 and the raised portion 2G so that the center of gravity CG is located at the center point of the magnet 15 and the vibration axis VA extends parallel to the Y-axis through the center point of the magnet 15.

Further, the vibration generating device 101 is configured such that the center of gravity thereof is positioned at the center of gravity CG of the vibration body VB.

Figure 13:
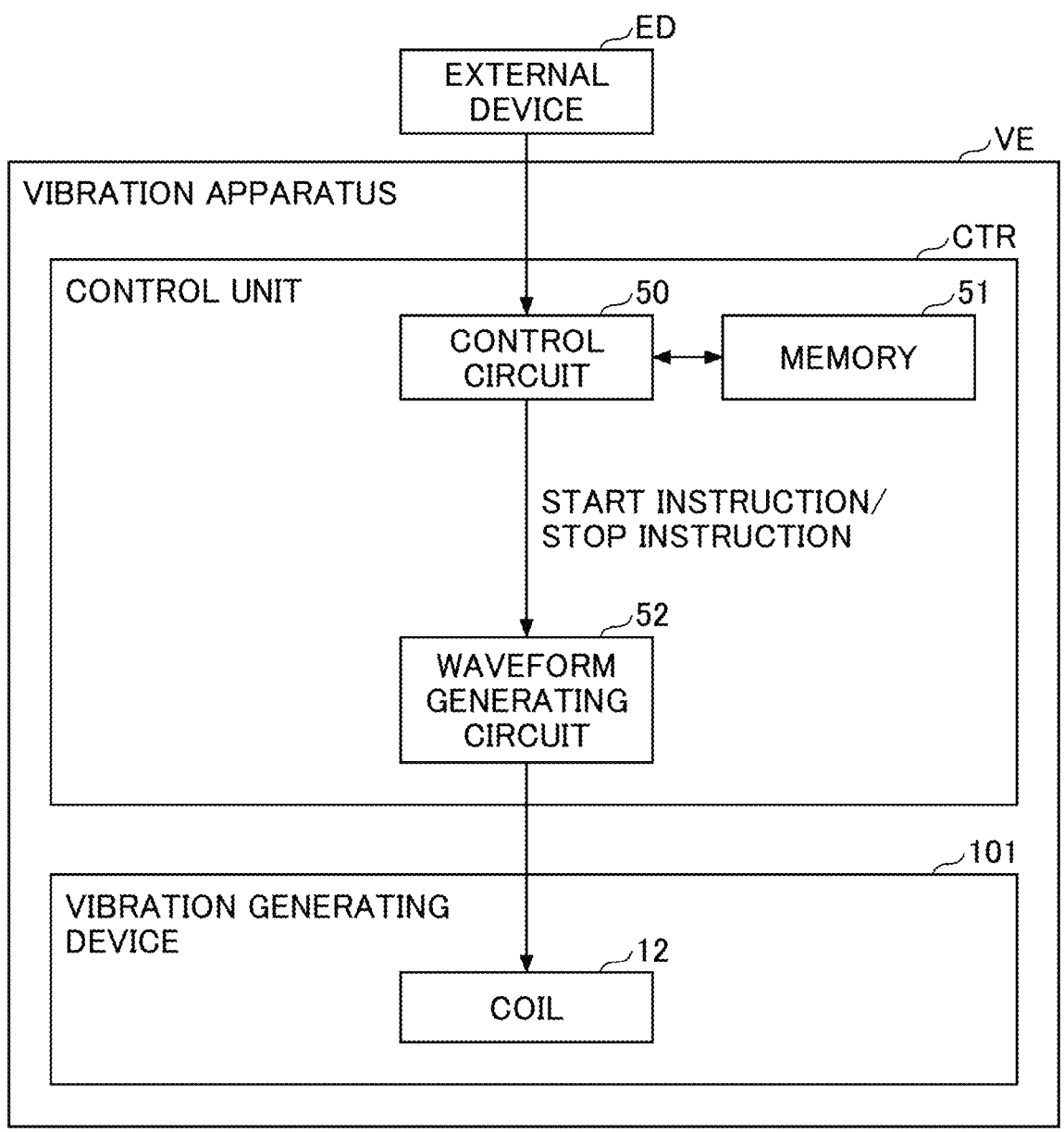
FIG. 13 is a functional block diagram of the vibration apparatus.

Next, a configuration example of the vibration apparatus VE will be described with reference to FIG. 13. FIG. 13 is a functional block diagram of the vibration apparatus VE. In the example illustrated in FIG. 13, the control unit CTR includes a control circuit 50, a memory 51, and a waveform generating circuit 52. The control unit CTR may include a signal amplification circuit, a digital-to-analog conversion circuit, an analog-to-digital conversion circuit, and the like as necessary.

The control circuit 50 is configured to control the movement of the vibration generating device 101. In the example illustrated in FIG. 13, the control circuit 50 is configured to refer to the information stored in the memory 51 and to start or stop the generation of a waveform by the waveform generating circuit 52.

The control circuit 50 may be configured to operate in response to a control instruction from an external device ED such as a computer outside the vibration apparatus VE. The external device ED may be a push button switch or the like. The external device ED and the control circuit 50 may be connected to each other in a wired or wireless manner.

The memory 51 is configured to store information used when the vibration generating device 101 is vibrated. In the example illustrated in FIG. 13, the memory 51 is a nonvolatile memory. However, the memory 51 may be a volatile memory.

The information stored in the memory 51 may include, for example, information relating to the voltage signal generated by the waveform generating circuit 52. The information relating to the voltage signal may include, for example, the frequency and amplitude of the voltage signal.

The waveform generating circuit 52 is configured to generate a voltage signal to be output to the coil 12 of the vibration generating device 101. In the example illustrated in FIG. 13, the waveform generating circuit 52 is configured to start outputting the voltage signal upon receiving a start instruction from the control circuit 50, and to stop outputting the voltage signal upon receiving a stop instruction from the control circuit 50.

In the example illustrated in FIG. 13, the control unit CTR is configured to control one vibration generating device 101, but may be configured to control two or more vibration generating devices 101.

Figure 14A:
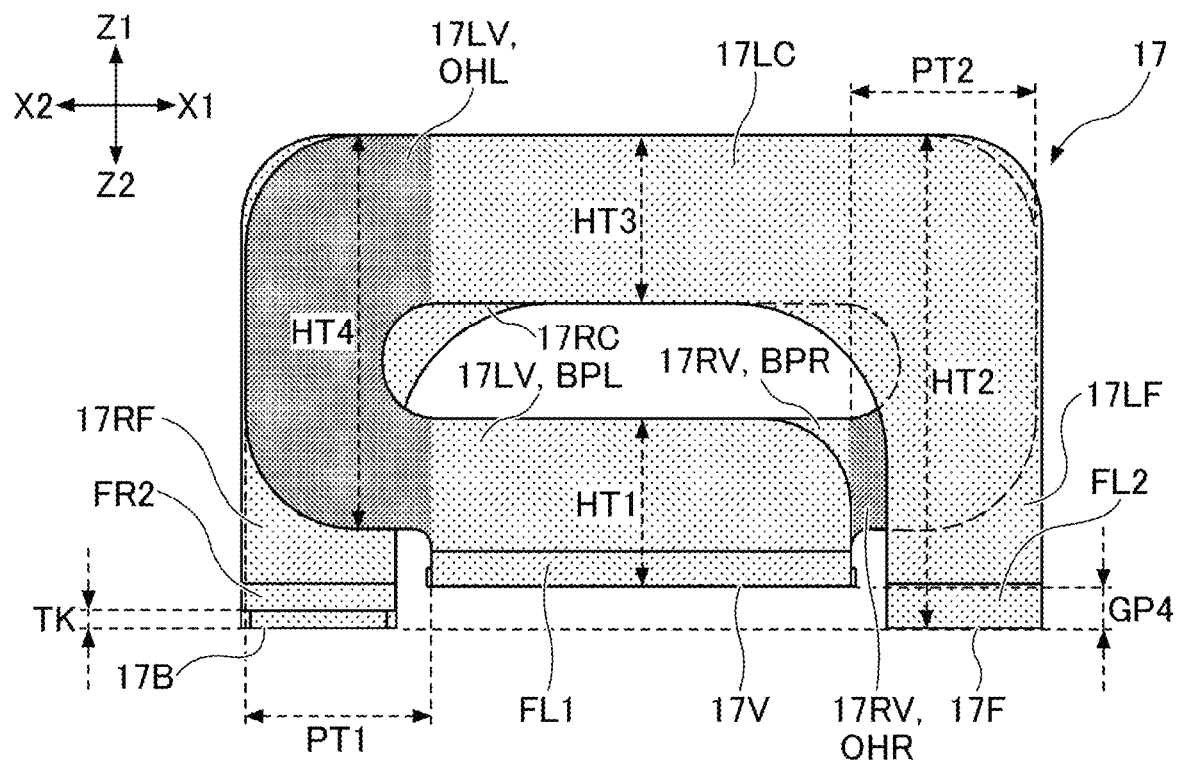
FIG. 14A is a left side view of the plate spring.
Figure 14B:
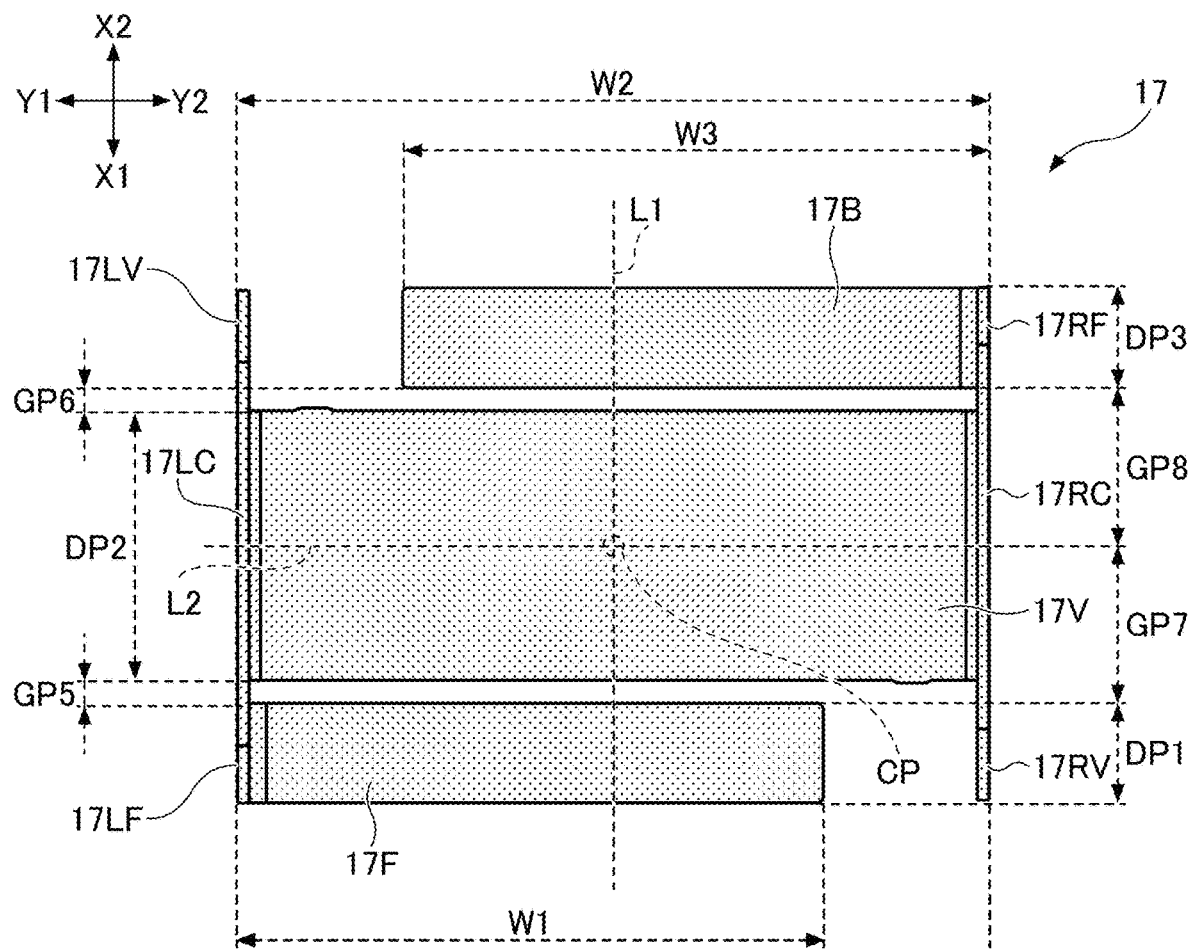
FIG. 14B is a top view of the plate spring.

Next, the plate spring 17 as the elastic support member ES will be described in detail with reference to FIGS. 14A and 14B. FIG. 14A is a left side view of the plate spring 17 when the vibration generating device 101 is in the initial state, and FIG. 14B is a top view of the plate spring 17 when the vibration generating device 101 is in the initial state. The initial state of the vibration generating device 101 means a state of the vibration generating device 101 when the vibration body VB is stationary, that is, when electric power is not supplied to the coil 12.

As described above, the plate spring 17 is formed of a non-magnetic material such as stainless steel, and includes the rear fixed plate portion 17B, the front fixed plate portion 17F, the left elastic plate portion 17L, the right elastic plate portion 17R, and the vibration plate portion 17V.

The left elastic plate portion 17L includes the left inner plate portion 17LV extending upward from the left end of the vibration plate portion 17V via a fold line FL1 along the front-rear direction formed at the left end of the vibration plate portion 17V, the left outer plate portion 17LF extending upward from one end (left end) of the front fixed plate portion 17F via a fold line FL2 along the front-rear direction formed at one end (left end) of the front fixed plate portion 17F, and the left connecting portion 17LC that connects the left inner plate portion 17LV and the left outer plate portion 17LF.

The right elastic plate portion 17R includes the right inner plate portion 17RV extending upward from the right end of the vibration plate portion 17V via a fold line FR1 along the front-rear direction formed at the right end of the vibration plate portion 17V, the right outer plate portion 17RF extending upward from one end (right end) of the rear fixed plate portion 17B via a fold line FR2 along the front-rear direction formed at one end (right end) of the rear fixed plate portion 17B, and the right connecting portion 17RC that connects the right inner plate portion 17RV and the right outer plate portion 17RF.

As illustrated in FIG. 14B, the left elastic plate portion 17L is configured such that outer surfaces (left side surfaces) of the left inner plate portion 17LV, the left outer plate portion 17LF, and the left connecting portion 17LC are positioned on the same plane, and the right elastic plate portion 17R is configured such that outer surfaces (right side surfaces) of the right inner plate portion 17RV, the right outer plate portion 17RF, and the right connecting portion 17RC are positioned on the same plane.

In the example illustrated in FIG. 14A, the left inner plate portion 17LV has a left overhang portion OHL and a left base portion BPL that protrude rearward from the rear end (end on the X2 side) of the vibration plate portion 17V, and the right inner plate portion 17RV has a right overhang portion OHR and a right base portion BPR that protrude forward from the front end (end on the X1 side) of the vibration plate portion 17V. In FIG. 14A, for the sake of clarification, the plate spring 17 is provided with a coarse dot pattern, and the left overhang portion OHL and the right overhang portion OHR are provided with a fine dot pattern.

More specifically, the left overhang portion OHL is configured to overhang rearward from the rear end (end on the X2 side) of the vibration plate portion 17V by an overhang amount PT1. In the example illustrated in the FIG. 14A, the rear end (end on the X2 side) of the left overhang portion OHL is configured to be positioned further forward than the rear end (end on the X2 side) of the right outer plate portion 17RF. However, the rear end (end on the X2 side) of the left overhang portion OHL may be configured to coincide with the rear end (end on the X2 side) of the right outer plate portion 17RF in a left side view, or may be configured to be positioned further rearward than the rear end (end on the X2 side) of the right outer plate portion 17RF.

Similarly, the right overhang portion OHR is configured to overhang forward from the front end (end on the X1 side) of the vibration plate portion 17V by an overhang amount PT2. In the example illustrated in FIG. 14A, the front end (end on the X1 side) of the right overhang portion OHR is configured to be positioned further rearward than the front end (end on the X1 side) of the left outer plate portion 17LF. However, the front end (end on the X1 side) of the right overhang portion OHR may be configured to coincide with the front end (end on the X1 side) of the left outer plate portion 17LF in a left side view, or may be configured to be positioned further forward than the front end (end on the X1 side) of the left outer plate portion 17LF.

In the example illustrated in FIG. 14A, the plate spring 17 is configured such that the overhang amount PT1 of the left overhang portion OHL and the overhang amount PT2 of the right overhang portion OHR are the same. However, the plate spring 17 may be configured such that the overhang amount PT1 of the left overhang portion OHL and the overhang amount PT2 of the right overhang portion OHR are different from each other.

As illustrated in the lower part of FIG. 5, when the plate spring 17 is fixed to the bottom plate portion 2B of the case 2, a gap GP1 is formed between the upper surface of the bottom plate portion 2B and the lower surface of the vibration plate portion 17V. Further, the plate spring 17 is configured such that a gap GP2 is formed between the lower surface of the front fixed plate portion 17F fixed to the upper surface of the left front raised portion 2GLF formed on the bottom plate portion 2B of the case 2, and the upper surface of the bottom plate portion 2B. Further, the plate spring 17 is configured such that a gap GP3 is formed between the lower surface of the rear fixed plate portion 17B fixed to the upper surface of the left rear raised portion 2GLB formed on the bottom plate portion 2B of the case 2, and the upper surface of the bottom plate portion 2B. The plate spring 17 is configured such that the gap GP1 is larger than each of the gap GP2 and the gap GP3. In the illustrated example, the case 2 is configured such that the raised amounts of the left front raised portion 2GLF, the right front raised portion 2GRF, the left rear raised portion 2GLB, and the right rear raised portion 2GRB are the same. That is, the case 2 is configured such that the gap GP2 and the gap GP3 are the same.

Further, as illustrated in FIG. 14A, the plate spring 17 is configured such that a gap GP4 larger than the thickness TK of the plate spring 17 is formed between the lower surface of the vibration plate portion 17V and the lower surfaces of the rear fixed plate portion 17B and the front fixed plate portion 17F.

Further, the plate spring 17 is configured such that the length (height) between the lower surface of the vibration plate portion 17V and the upper end of the left base portion BPL and the length (height) between the lower surface of the vibration plate portion 17V and the upper end of the right base portion BPR are the same height HT1.

Further, the plate spring 17 is configured such that the length (height) between the lower surface of the front fixed plate portion 17F and the upper end of the left outer plate portion 17LF and the length (height) between the lower surface of the rear fixed plate portion 17B and the upper end of the right outer plate portion 17RF are the same height HT2.

Further, the plate spring 17 is configured such that the length (height) between the upper end and the lower end at the central portion of the left connecting portion 17LC, and the length (height) between the upper end and the lower end at the central portion of the right connecting portion 17RC are the same height HT3.

Further, the plate spring 17 is configured such that the length (height) between the upper end and the lower end of the left overhang portion OHL and the length (height) between the upper end and the lower end of the right overhang portion OHR are the same height HT4.

Further, as illustrated in FIG. 14B, the plate spring 17 is configured such that the depth DP1 of the front fixed plate portion 17F in the front-rear direction (X-axis direction) is smaller than the depth DP2 of the vibration plate portion 17V, and the depth DP3 of the rear fixed plate portion 17B in the front-rear direction (X-axis direction) is smaller than the depth DP2 of the vibration plate portion 17V. In the illustrated example, the plate spring 17 is configured such that the depth DP1 and the depth DP3 are the same. However, the plate spring 17 may be configured such that the depth DP1 and the depth DP3 are different from each other. Further, the plate spring 17 may be configured such that at least one of the depth DP1 and the depth DP3 is larger than the depth DP2.

Further, as illustrated in FIG. 14B, the plate spring 17 is configured such that a gap GP5 is formed between the front fixed plate portion 17F and the vibration plate portion 17V and a gap GP6 is formed between the rear fixed plate portion 17B and the vibration plate portion 17V in the front-rear direction (X-axis direction). In the illustrated example, the plate spring 17 is configured such that the gap GP5 and the gap GP6 are the same. However, the plate spring 17 may be configured such that the gap GP5 and the gap GP6 are different from each other. Further, the plate spring 17 may be configured such that the vibration plate portion 17V and at least one of the rear fixed plate portion 17B and the front fixed plate portion 17F overlap in a non-contact state in a top view.

Further, as illustrated in FIG. 14B, the plate spring 17 is configured such that the width W1 of the front fixed plate portion 17F in the horizontal direction (Y-axis direction) is smaller than the width W2 of the vibration plate portion 17V, and the width W3 of the rear fixed plate portion 17B in the horizontal direction (Y-axis direction) is smaller than the width W2 of the vibration plate portion 17V. Specifically, as illustrated in FIG. 14B, the plate spring 17 is configured such that the front fixed plate portion 17F extends to the right beyond the broken line L1, and the rear fixed plate portion 17B extends to the left beyond the broken line L1. The broken line L1 is a line parallel to the X-axis passing through the center point CP of the plate spring 17. In the illustrated example, the plate spring 17 is configured such that the width W1 and the width W3 are the same. However, the plate spring 17 may be configured such that the width W1 and the width W3 are different from each other.

As illustrated in FIG. 14B, the plate spring 17 is configured such that a gap GP7 is formed between the broken line L2 and the front fixed plate portion 17F, and a gap GP8 is formed between the broken line L2 and the rear fixed plate portion 17B. A broken line L2 is a line parallel to the Y-axis passing through the center point CP of the plate spring 17. In the illustrated example, the plate spring 17 is configured such that the gap GP7 and the gap GP8 are the same. However, the plate spring 17 may be configured such that the gap GP7 and the gap GP8 are different from each other.

The natural oscillation frequency of the vibration portion VP can be adjusted to any value by changing each of the thickness TK, the overhang amount PT1, the overhang amount PT2, the heights HT1 to HT4, the gaps GP1 to GP8, and the widths W1 to W3 described above.

In the illustrated example, the plate spring 17 is formed so as to have two-fold rotational symmetry with respect to the center point CP in a top view as illustrated in FIG. 14B. However, the plate spring 17 may be formed so as to be rotationally asymmetric with respect to the center point CP.

Further, the plate spring 17 is configured such that each of the left elastic plate portion 17L and the right elastic plate portion 17R is perpendicular to each of the rear fixed plate portion 17B, the front fixed plate portion 17F, and the vibration plate portion 17V. However, the plate spring 17 may be configured such that at least one of the left elastic plate portion 17L and the right elastic plate portion 17R is non-perpendicular to each of the rear fixed plate portion 17B, the front fixed plate portion 17F, and the vibration plate portion 17V. For example, in the plate spring 17, at least one of the left elastic plate portion 17L and the right elastic plate portion 17R may be configured to extend obliquely upward with respect to each of the rear fixed plate portion 17B, the front fixed plate portion 17F, and the vibration plate portion 17V.

As described above, the vibration generating device 101 according to an embodiment of the present invention includes, for example, as illustrated in FIGS. 2 and 3, the housing HS, the vibration body VB accommodated in the housing HS, the elastic support member ES fixed to the housing HS and supporting the vibration body VB so as to be able to vibrate, and the driving means DM applying a vibration force to the vibration body VB.

The plate spring 17 as the elastic support member ES includes the vibration plate portion 17V supporting the vibration body VB, the front fixed plate portion 17F disposed in front of (X1 side) the vibration plate portion 17V and fixed to the housing HS, the rear fixed plate portion 17B disposed behind (X2 side) the vibration plate portion 17V and fixed to the housing HS, the left elastic plate portion 17L as a flat-plate-shaped first elastic plate portion connecting one end (end on the Y1 side) of the vibration plate portion 17V and the front fixed plate portion 17F, and the right elastic plate portion 17R as a flat-plate-shaped second elastic plate portion connecting the other end (end on the Y2 side) of the vibration plate portion 17V and the rear fixed plate portion 17B. The left elastic plate portion 17L as the first elastic plate portion and the rear fixed plate portion 17B are separated from each other, and the right elastic plate portion 17R as the second elastic plate portion and the front fixed plate portion 17F are separated from each other. That is, the left elastic plate portion 17L and the rear fixed plate portion 17B are not directly connected to each other, and the right elastic plate portion 17R and the front fixed plate portion 17F are not directly connected to each other.

This configuration brings about an effect that the vibration of the vibration body VB in the vertical direction (Z-axis direction) can be reduced while sufficiently ensuring the vibration width of the vibration body VB in the horizontal direction (Y-axis direction). This is because one end of the vibration plate portion 17V is fixed to the housing HS (the bottom plate portion 2B of the case 2) in front of the vibration plate portion 17V via the left elastic plate portion 17L and the front fixed plate portion 17F, and the other end of the vibration plate portion 17V is fixed to the housing HS (the bottom plate portion 2B of the case 2) behind the vibration plate portion 17V via the right elastic plate portion 17R and the rear fixed plate portion 17B. That is, one end of the vibration plate portion 17V is not directly connected to the rear fixed plate portion 17B, and the other end of the vibration plate portion 17V is not directly connected to the front fixed plate portion 17F.

Figure 15A:
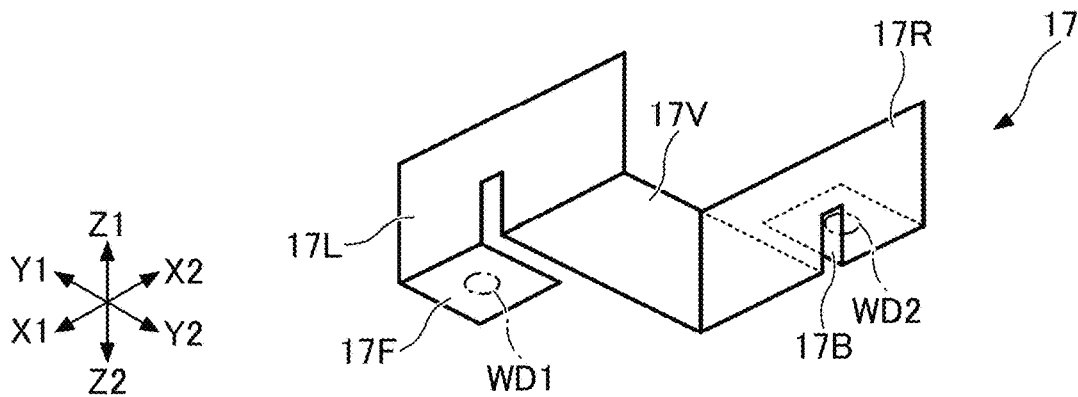
FIGS. 15A to 15C are schematic perspective views of a plate spring.
Figure 15B:
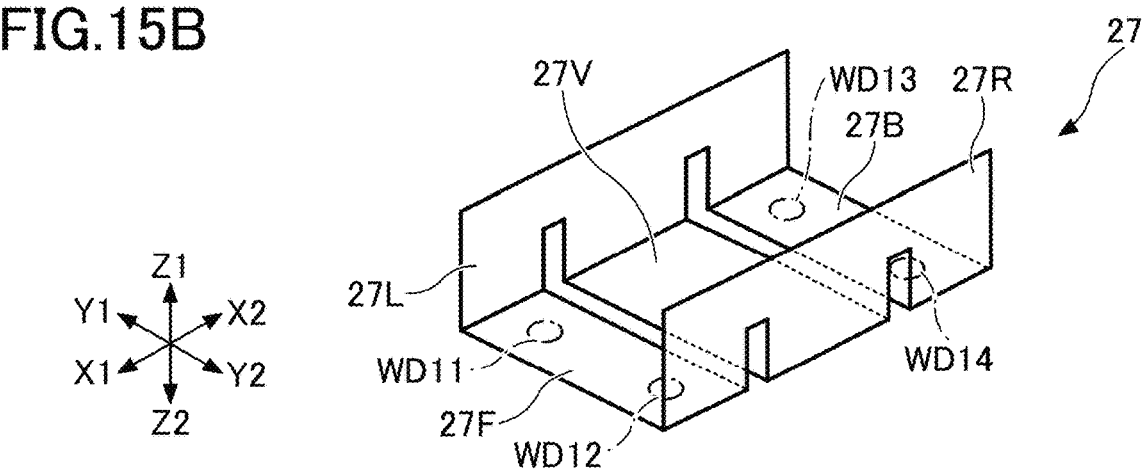
Figure 15C:
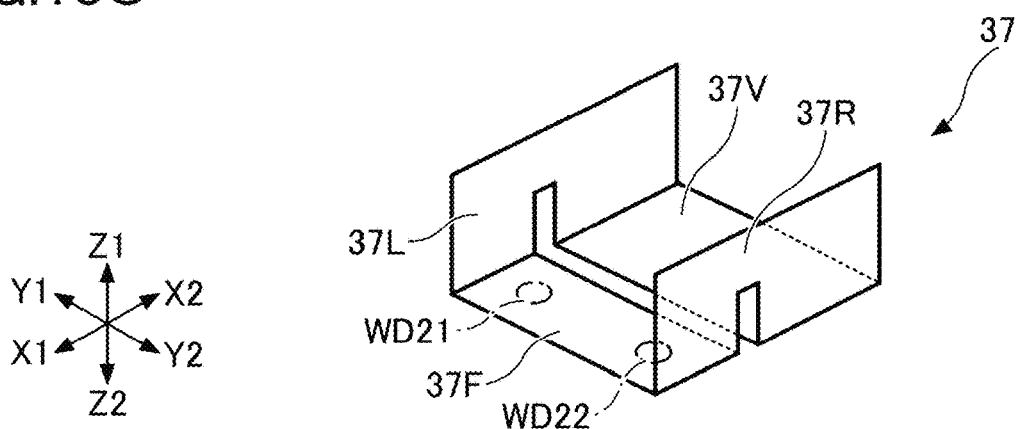

The effect of the plate spring 17 will be described with reference to FIGS. 15A to 15C. FIGS. 15A to 15C are diagrams illustrating the difference between the plate spring 17 according to the embodiment of the present invention and each of a plate spring 27 and a plate spring 37 as comparative examples. Specifically, FIG. 15A is a schematic perspective view of the plate spring 17 according to the embodiment of the present invention. FIG. 15B is a schematic perspective view of the plate spring 27 as a comparative example, and FIG. 15C is a schematic perspective view of the plate spring 37 as another comparative example. A rear fixed plate portion 27B, a front fixed plate portion 27F, a left elastic plate portion 27L, a right elastic plate portion 27R, and a vibration plate portion 27V of the plate spring 27 correspond to the rear fixed plate portion 17B, the front fixed plate portion 17F, the left elastic plate portion 17L, the right elastic plate portion 17R, and the vibration plate portion 17V of the plate spring 17, respectively. A front fixed plate portion 37F, a left elastic plate portion 37L, a right elastic plate portion 37R, and a vibration plate portion 37V of the plate spring 37 correspond to the front fixed plate portion 17F, the left elastic plate portion 17L, the right elastic plate portion 17R, and the vibration plate portion 17V of the plate spring 17, respectively.

Welded portions WD1, WD2, WD11 to WD14, WD21, and WD22 in FIGS. 15A to 15C indicate portions where the plate spring and the bottom plate portion 2B of the case 2 are welded.

The plate spring 27 is different from the plate spring 17 mainly in that the left elastic plate portion 27L is connected not only to the front fixed plate portion 27F but also to the rear fixed plate portion 27B, and the right elastic plate portion 27R is connected not only to the rear fixed plate portion 27B but also to the front fixed plate portion 27F.

That is, the plate spring 27 is configured such that one end of the vibration plate portion 27V is fixed to the bottom plate portion 2B in front of the vibration plate portion 27V via the left elastic plate portion 27L and the front fixed plate portion 27F, and one end of the vibration plate portion 27V is fixed to the bottom plate portion 2B behind the vibration plate portion 27V via the left elastic plate portion 27L and the rear fixed plate portion 27B, and the other end of the vibration plate portion 27V is fixed to the bottom plate portion 2B in front of the vibration plate portion 27V via the right elastic plate portion 27R and the front fixed plate portion 27F, and the other end of the vibration plate portion 27V is fixed to the bottom plate portion 2B behind the vibration plate portion 27V via the right elastic plate portion 27R and the rear fixed plate portion 27B.

Therefore, in the vibration generating device including the plate spring 27, the spring rigidity becomes excessively high compared to the vibration generating device 101 including the plate spring 17, and there is a concern that the vibration width of the vibration body VB in the horizontal direction (Y-axis direction) becomes excessively small. This is because, in the plate spring 27, the characteristic of reducing the vibration of the vibration plate portion 27V in the horizontal direction is strengthened as compared with the plate spring 17.

The plate spring 37 is different from the plate spring 17 mainly in that the plate spring 37 does not include a rear fixed plate portion. Specifically, the plate spring 37 differs from the plate spring 17 mainly in that the right elastic plate portion 37R is connected to the front fixed plate portion 37F instead of the rear fixed plate portion.

That is, the plate spring 37 is configured such that one end of the vibration plate portion 37V is fixed to the bottom plate portion 2B in front of the vibration plate portion 37V via the left elastic plate portion 37L and the front fixed plate portion 37F, and the other end of the vibration plate portion 37V is also fixed to the bottom plate portion 2B in front of the vibration plate portion 37V via the right elastic plate portion 37R and the front fixed plate portion 37F.

Therefore, in the vibration generating device including the plate spring 37, the spring rigidity becomes excessively low compared to the vibration generating device 101 including the plate spring 17, and there is a concern that the vibration body VB is excessively greatly vibrated in the vertical direction (Z-axis direction). This is because the plate spring 37 is fixed to the bottom plate portion 2B only at the front side of the vibration plate portion 37V and is not fixed to the bottom plate portion 2B at the rear side of the vibration plate portion 37V. That is, in the plate spring 37, the characteristic of preventing the vibration of the vibration plate portion 37V in the vertical direction is limited as compared with the plate spring 17.

In the vibration generating device 101 according to the embodiment of the present invention, as illustrated in FIG. 3, the left elastic plate portion 17L may include the left inner plate portion 17LV extending upward (in the Z1 direction) from the left end (Y1 side end) of the vibration plate portion 17V via the fold line FL1 along the front-rear direction (X-axis direction) formed at the left end (Y1 side end) of the vibration plate portion 17V, and the left outer plate portion 17LF extending upward (in the Z1 direction) from one end (Y1 side end) of the front fixed plate portion 17F via the fold line FL2 along the front-rear direction (X-axis direction) formed at one end (Y1 side end) of the front fixed plate portion 17F, and the left connecting portion 17LC connecting the left inner plate portion 17LV and the left outer plate portion 17LF. Similarly, as illustrated in FIG. 3, the right elastic plate portion 17R may include the right inner plate portion 17RV extending upward (in the Z1 direction) from the right end (Y2 side end) of the vibration plate portion 17V via the fold line FR1 along the front-rear direction (X-axis direction) formed at the right end (Y2 side end) of the vibration plate portion 17V, the right outer plate portion 17RF extending upward (in the Z1 direction) from the one end (Y2 side end) of the rear fixed plate portion 17B via the fold line FR2 along the front-rear direction (X-axis direction) formed at one end (Y2 side end) of the rear fixed plate portion 17B, and the right connecting portion 17RC connecting the right inner plate portion 17RV and the right outer plate portion 17RF.

This configuration brings about an effect of facilitating formation of the elastic support member ES. This is because the plate spring 17 as the elastic support member ES can be formed by, for example, punching and bending a single metal plate formed of non-magnetic stainless steel or the like.

As illustrated in FIG. 14A, the left inner plate portion 17LV of the left elastic plate portion 17L may have the left overhang portion OHL that overhangs rearward (in the X2 direction) from the vibration plate portion 17V. Similarly, the right inner plate portion 17RV of the right elastic plate portion 17R may have the right overhang portion OHR that overhangs forward (in the X1 direction) from the vibration plate portion 17V.

This configuration brings about an effect that the spring constant of the elastic support member ES can be easily adjusted. This is because the lengths of the left connecting portion 17LC and the right connecting portion 17RC in the front-rear direction (X-axis direction) can be easily adjusted.

In the illustrated example, the vibration generating device 101 is configured such that the left elastic plate portion 17L connects the left end (end on the Y1 side) of the vibration plate portion 17V and the left end (end on the Y1 side) of the front fixed plate portion 17F, and the right elastic plate portion 17R connects the right end (end on the Y2 side) of the vibration plate portion 17V and the right end (end on the Y2 side) of the rear fixed plate portion 17B. However, the vibration generating device 101 may be configured such that the left elastic plate portion 17L connects the left end (end on the Y1 side) of the vibration plate portion 17V and the left end (end on the Y1 side) of the rear fixed plate portion 17B, and the right elastic plate portion 17R connects the right end (end on the Y2 side) of the vibration plate portion 17V and the right end (end on the Y2 side) of the front fixed plate portion 17F. In this case, the left overhang portion OHL may be configured to overhang forward (in the X1 direction) from the vibration plate portion 17V, and the right overhang portion OHR may be configured to overhang rearward (in the X2 direction) from the vibration plate portion 17V.

As illustrated in FIG. 5, the vibration generating device 101 may be configured such that the gap GP1 between the upper surface of the bottom plate portion 2B of the housing HS (the case 2) and the lower surface of the vibration plate portion 17V is larger than the gap GP2 between the upper surface of the bottom plate portion 2B of the housing HS (the case 2) and the lower surface of the front fixed plate portion 17F, and larger than the gap GP3 between the upper surface of the bottom plate portion 2B of the housing HS (the case 2) and the lower surface of the rear fixed plate portion 17B.

This configuration brings about an effect of reducing or preventing contact between the lower yoke 16 and the rear fixed plate portion 17B. In particular, as illustrated in FIG. 12B, even in a configuration in which the rear end (end on the X2 side) of the lower yoke 16 protrudes further rearward than the rear end (end on the X2 side) of the vibration plate portion 17V, it is possible to bring about the effect of reducing or preventing the contact between the lower yoke 16 and the rear fixed plate portion 17B. Therefore, this configuration has an effect of reducing or preventing generation of noise caused by contact between the lower yoke 16 and the rear fixed plate portion 17B.

Further, this configuration brings about an effect of reducing or preventing contact between the vibration plate portion 17V and the bottom plate portion 2B of the case 2. Therefore, this configuration has an effect of reducing or preventing generation of noise due to contact between the vibration plate portion 17V and the bottom plate portion 2B of the case 2.

Further, the first elastic plate portion may include a plurality of portions, and surfaces of the plurality of portions may be positioned on the same plane. Similarly, the second elastic plate portion may include a plurality of portions, and the surfaces of the plurality of portions may be positioned on the same plane. Specifically, the left elastic plate portion 17L as the first elastic plate portion may include the left inner plate portion 17LV, the left outer plate portion 17LF, and the left connecting portion 17LC as illustrated in FIG. 3, and may be configured such that respective surfaces of the left inner plate portion 17LV, the left outer plate portion 17LF, and the left connecting portion 17LC are positioned on the same plane as illustrated in FIG. 14B. Similarly, as illustrated in FIG. 3, the right elastic plate portion 17R as the second elastic plate portion may include the right inner plate portion 17RV, the right outer plate portion 17RF, and the right connecting portion 17RC, and may be configured such that respective surfaces of the right inner plate portion 17RV, the right outer plate portion 17RF, and the right connecting portion 17RC are positioned on the same plane as illustrated in FIG. 14B.

This configuration brings about an effect that the width of the vibration generating device 101 in the horizontal direction (Y-axis direction) can be reduced. This is because the widths of the spaces occupied by the left elastic plate portion 17L and the right elastic plate portion 17R in the horizontal direction (Y-axis direction) are substantially equal to the thicknesses TK (see FIG. 14A) of the plate spring 17.

Preferred embodiments of the present invention have been described above in detail. However, the present invention is not limited to the embodiments described above. Various modifications or replacements and the like can be applied to the above-described embodiments without departing from the scope of the present invention. Further, each of the features described with reference to the above-described embodiments may be appropriately combined unless there is a technical contradiction.

For example, in the above-described embodiment, the magnet 15 is a constituent element of the vibration body VB, and the coil 12 is a constituent element of the non-vibration body NV, but the magnet 15 may be a constituent element of the non-vibration body NV, and the coil 12 may be a constituent element of the vibration body VB. That is, in the vibration generating device 101, for example, the coil 12 may vibrate together with the upper yoke 10 and the lower yoke 16, and the magnet 15 may be fixed to the bracket 11.

Further, in the above-described embodiment, as illustrated in FIG. 14B, the plate spring 17 is configured such that the front fixed plate portion 17F and the rear fixed plate portion 17B are positioned between the left elastic plate portion 17L and the right elastic plate portion 17R in a top view. However, the plate spring 17 may be configured as illustrated in the upper part of FIG. 16.

Figure 16:
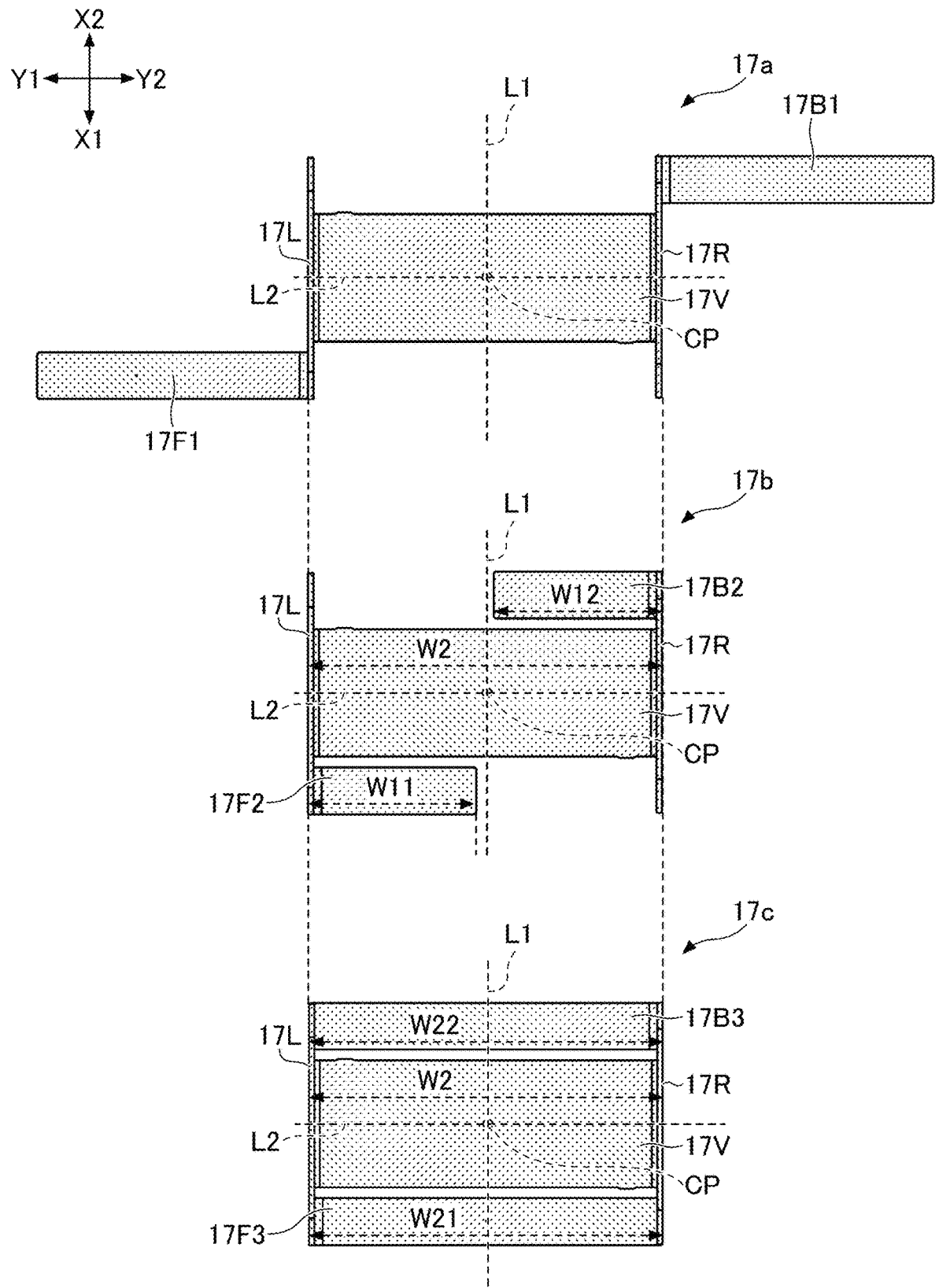
FIG. 16 is a top view of the plate spring.

FIG. 16 is a top view of another configuration example of the plate spring 17, and corresponds to the FIG. 14B. More specifically, the upper part of FIG. 16 is a top view of a plate spring 17a which is another configuration example of the plate spring 17.

More specifically, the plate spring 17a illustrated in the upper part of FIG. 16 is different from the plate spring 17 in that a front fixed plate portion 17F1, which is an example of the front fixed plate portion 17F, is located on the left side (Y1 side) of the left elastic plate portion 17L, and a rear fixed plate portion 17B1, which is an example of the rear fixed plate portion 17B, is located on the right side (Y2 side) of the right elastic plate portion 17R, but is the same as the plate spring 17 in other respects.

The plate spring 17a may be configured such that one of the front fixed plate portion 17F1 and the rear fixed plate portion 17B1 is positioned between the left elastic plate portion 17L and the right elastic plate portion 17R.

As illustrated in FIG. 14B, the plate spring 17 is configured such that each of the width W1 of the front fixed plate portion 17F and the width W3 of the rear fixed plate portion 17B is larger than half of the width W2 of the vibration plate portion 17V. However, the plate spring 17 may be configured as illustrated in the middle and lower parts of FIG. 16.

The middle part of FIG. 16 is a top view of a plate spring 17b which is yet another configuration example of the plate spring 17, and the lower part of FIG. 16 is a top view of a plate spring the 17c which is yet another configuration example of the plate spring 17.

The plate spring 17b illustrated in the middle part of FIG. 16 is configured such that each of the width W11 of a front fixed plate portion 17F2, which is another example of the front fixed plate portion 17F, and the width W12 of a rear fixed plate portion 17B2, which is another example of the rear fixed plate portion 17B, is less than a half of the width W2 of the vibration plate portion 17V. In the illustrated example, the plate spring 17b is configured such that the widths W11 and W12 are the same, but the widths W11 and W12 may be configured such that the widths W11 and W12 are different from each other. Further, the widths W11 and W12 may be equal to half of the width W2 of the vibration plate portion 17V.

The plate spring 17c illustrated in the lower part of FIG. 16 is configured such that each of the width W21 of the front fixed plate portion 17F3, which is yet another example of the front fixed plate portion 17F, and the width W22 of the rear fixed plate portion 17B3, which is yet another example of the rear fixed plate portion 17B, are the same as the width W2 of the vibration plate portion 17V. The plate spring 17c may be configured such that at least one of the width W21 of the front fixed plate portion 17F3 and the width W22 of the rear fixed plate portion 17B3 is larger than the width W2 of the vibration plate portion 17V.

In the above-described embodiment, the rear fixed plate portion 17B and the front fixed plate portion 17F of the plate spring 17 are fixed to the bottom plate portion 2B of the case 2. However, the rear fixed plate portion 17B and the front fixed plate portion 17F may be fixed to the ceiling surface of the cover 1 or the inner surface of the outer peripheral wall portion 2A of the case 2 by welding or the like.

In the above-described embodiment, the rear fixed plate portion 17B and the front fixed plate portion 17F of the plate spring 17 are configured to extend parallel to the upper surface of the bottom plate portion 2B of the case 2. However, the rear fixed plate portion 17B and the front fixed plate portion 17F may be configured to be non-parallel to the upper surface of the bottom plate portion 2B. For example, the front fixed plate portion 17F may be configured to extend parallel to the inner surface of the first side plate portion 2A1 of the case 2, and the rear fixed plate portion 17B may be configured to extend parallel to the inner surface of the third side plate portion 2A3 of the case 2.

In the above-described embodiment, the rear fixed plate portion 17B and the front fixed plate portion 17F of the plate spring 17 are welded to the upper surface of the raised portion 2G formed on the bottom plate portion 2B of the case 2. However, as long as the gap GP4 (see FIG. 14A) is formed between the lower surface of the vibration plate portion 17V and the lower surfaces of the rear fixed plate portion 17B and the front fixed plate portion 17F, the raised portion 2G may be omitted. This is because contact between the lower surface of the vibration plate portion 17V and the upper surface of the bottom plate portion 2B of the case 2 is avoided by the gap GP4, even if there is no raised portion 2G. In this case, the rear fixed plate portion 17B and the front fixed plate portion 17F may be fixed to the upper surface of the bottom plate portion 2B by welding or the like.

According to an aspect of the present invention, the vibration generating device can reduce vibration in the vertical direction while sufficiently ensuring a vibration width in the horizontal direction.

What is claimed is:

1. A vibration generating device comprising:
   a housing;
   a vibration body accommodated in the housing;
   an elastic support member fixed to the housing and configured to support the vibration body so as to be able to vibrate; and
   a driver configured to apply a vibration force to the vibration body, wherein
   the elastic support member includes:
      a vibration plate portion configured to support the vibration body;
      a front fixed plate portion disposed in front of the vibration plate portion and fixed to the housing;
      a rear fixed plate portion disposed behind the vibration plate portion and fixed to the housing;
      a first elastic plate portion shaped as a flat plate and configured to connect one end of a left end and a right end of the vibration plate portion to the front fixed plate portion; wherein the first elastic plate portion includes, an inner plate portion extending in orthogonal direction from the vibration plate portion, an outer plate portion extending in orthogonal direction from the front fixed plate portion via a fold line, and a connecting portion extending in orthogonal direction from the outer plate portion and connecting the inner plate portion with the outer plate portion; and
      a second elastic plate portion shaped as a flat plate and configured to connect the other end of the left end and the right end of the vibration plate portion to the rear fixed plate portion, wherein the second elastic plate portion includes, and inner plate portion extending in orthogonal direction from the vibration plate portion, an outer plate portion extending in orthogonal direction from the rear fixed plate portion via a fold line, and a connecting portion extending in orthogonal direction from the outer plate portion and connecting the inner plate portion with the outer plate portion, wherein
   the first elastic plate portion is isolated from the rear fixed plate portion, and the second elastic plate portion is isolated from the front fixed plate portion.

2. The vibration generating device according to claim 1, wherein
   the first elastic plate portion includes:
      a left inner plate portion extending upward from the left end of the vibration plate portion via a fold line along a front-rear direction formed on the left end of the vibration plate portion;
      a left outer plate portion extending upward from one end of either the front fixed plate portion or the rear fixed plate portion via a fold line along a front-rear direction formed on the one end of either the front fixed plate portion or the rear fixed plate portion; and
      a left connector configured to connect the left inner plate portion to the left outer plate portion, and wherein
   the second elastic plate portion includes:
      a right inner plate portion extending upward from the right end of the vibration plate portion via a fold line along a front-rear direction formed on the right end of the vibration plate portion;
      a right outer plate portion extending upward from the other end of either the front fixed plate portion or the rear fixed plate portion via a fold line along a front-rear direction formed on the other end of either the front fixed plate portion or the rear fixed plate portion; and
      a right connector configured to connect the right inner plate portion to the right outer plate portion.

3. The vibration generating device according to claim 2, wherein
   the left inner plate portion includes a left overhang portion that overhangs in one direction among a frontward direction and a rearward direction from the vibration plate portion, and
   the right inner plate portion includes a right overhang portion that overhangs in another direction among the frontward direction and the rearward direction from the vibration plate portion.

4. The vibration generating device according to claim 1, wherein a gap between an upper surface of a bottom plate portion of the housing and a lower surface of the vibration plate portion is larger than a gap between the upper surface of the bottom plate portion of the housing and a lower surface of the front fixed plate portion, and is also larger than a gap between the upper surface of the bottom plate portion of the housing and a lower surface of the rear fixed plate portion.

5. The vibration generating device according to claim 1, wherein
   the first elastic plate portion includes a plurality of portions, and surfaces of the plurality of portions of the first elastic plate portion are positioned on a same plane, and
   the second elastic plate portion includes a plurality of portions, and surfaces of the plurality of portions of the second elastic plate portion are positioned on a same plane.

* * * * *